(12) United States Patent  
Hoshino et al.

(10) Patent No.: US 7,956,363 B2
(45) Date of Patent: Jun. 7, 2011

(54) SUBSTRATE FOR DISPLAY DEVICE AND LIQUID CRYSTAL DISPLAY DEVICE HAVING THE SAME

(75) Inventors: Atsuyuki Hoshino, Nara (JP); Katsunori Misaki, Tottori (JP); Akihiro Matsui, Tottori (JP); Hideya Hashii, Tottori (JP)

(73) Assignee: Sharp Kabushiki Kaisha, Osaka (JP)

( * ) Notice: Subject to any disclaimer, the term of this patent is extended or adjusted under 35 U.S.C. 154(b) by 1006 days.

(21) Appl. No.: 11/439,994

(22) Filed: May 25, 2006

(65) Prior Publication Data

US 2007/0080349 A1   Apr. 12, 2007

(30) Foreign Application Priority Data

May 27, 2005   (JP) ................ 2005-155630

(51) Int. Cl.
*H01L 29/786* (2006.01)
*H01L 27/14* (2006.01)
*H01L 29/04* (2006.01)
(52) U.S. Cl. ............ 257/72; 257/E27.132; 349/113
(58) Field of Classification Search .......... 257/72, 257/81, 654, 651, E27.13, E27.132; 349/113
See application file for complete search history.

(56) References Cited

U.S. PATENT DOCUMENTS

| 6,297,519 | B1 | 10/2001 | Fujikawa et al. |
| 6,509,215 | B2 | 1/2003 | Fujikawa et al. |
| 6,924,858 | B2 | 8/2005 | Nagayama et al. |
| 6,977,698 | B2 | 12/2005 | Ikeno et al. |
| 7,015,995 | B2 | 3/2006 | Ikeno et al. |
| 7,245,337 | B2 | 7/2007 | Ikeno et al. |
| 2003/0007115 | A1 | 1/2003 | Nagayama et al. |
| 2003/0038907 | A1 | 2/2003 | Ikeno et al. |
| 2004/0218120 | A1 | 11/2004 | Ikeno et al. |
| 2006/0033866 | A1* | 2/2006 | Sugiura .............. 349/113 |
| 2006/0038940 | A1 | 2/2006 | Ikeno et al. |
| 2006/0061713 | A1* | 3/2006 | Nakamura et al. ........ 349/113 |

FOREIGN PATENT DOCUMENTS

| JP | 6-291318 A | 10/1994 |
| JP | 2000-77666 A | 3/2000 |
| JP | 2003-57638 A | 2/2003 |
| JP | 2003-84302 A | 3/2003 |
| JP | 2004-341186 | 12/2004 |

\* cited by examiner

*Primary Examiner* — W. David Coleman
(74) *Attorney, Agent, or Firm* — Birch, Stewart, Kolasch & Birch, LLP

(57) ABSTRACT

The present invention relates to a substrate for a liquid crystal display device and a liquid crystal display device having the substrate, an object of the invention is to provide such a substrate for a display device that can be obtained by a simple production method with high reliability, and a liquid crystal display device having the same. A substrate for a display device contains: an accumulated electrode having an accumulated structure containing a lower layer formed on a substrate, and a upper layer containing ZnO and formed on the lower layer; an insulating film covering the accumulated electrode; a contact hole opening in the insulating film on the accumulated electrode; and a pixel electrode formed on the insulating film and being connected directly to the upper layer of the accumulated electrode through the contact hole.

19 Claims, 27 Drawing Sheets

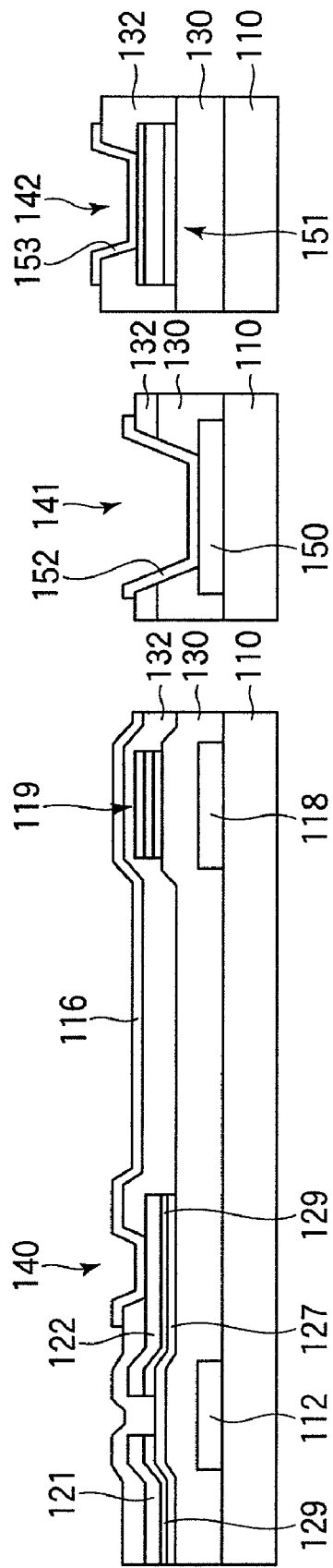

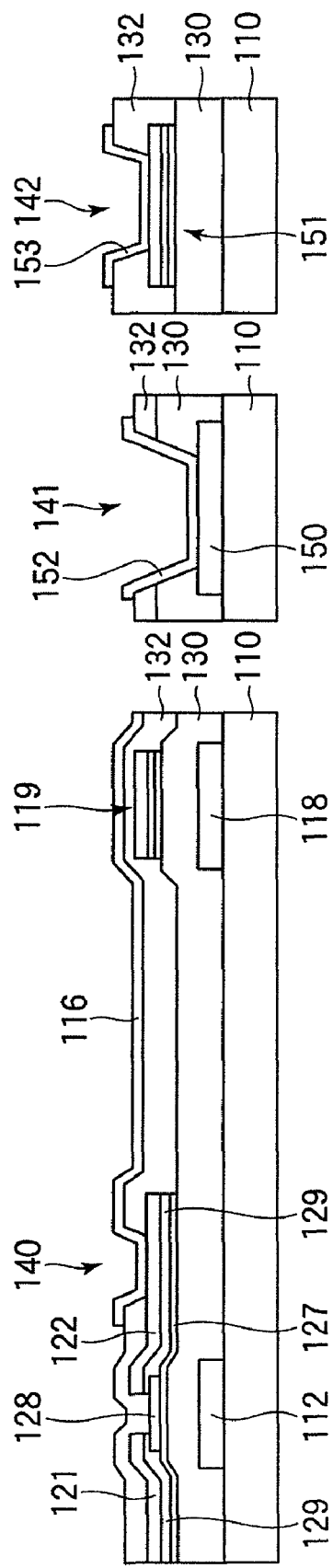

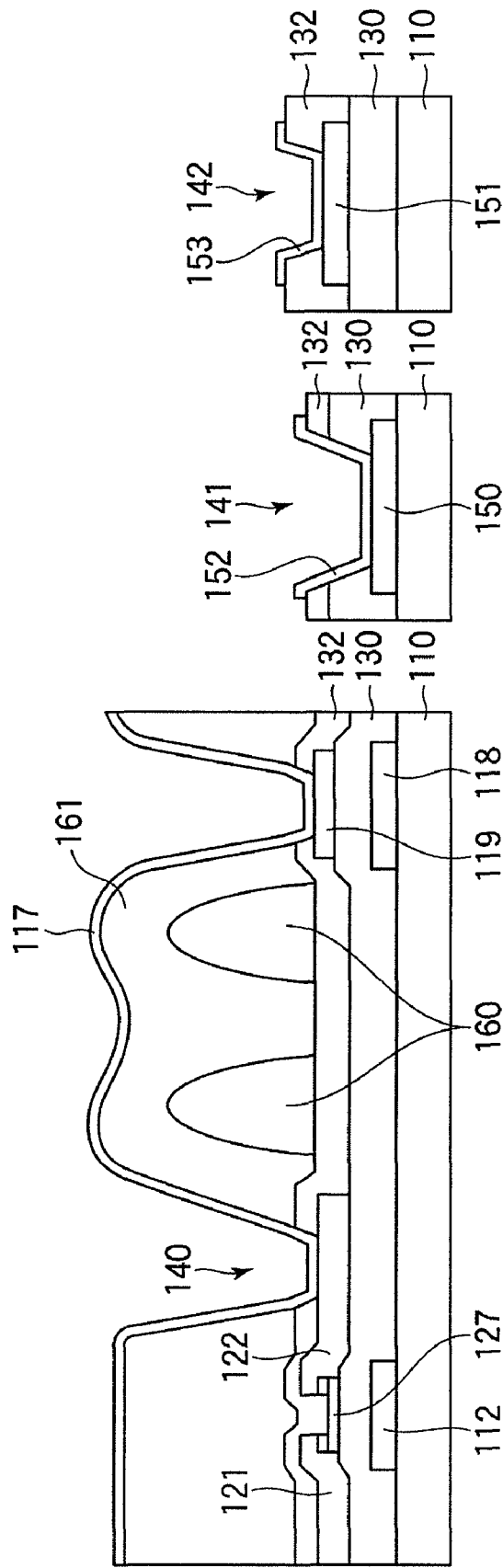

SUBSTRATE FOR DISPLAY DEVICE AND LIQUID CRYSTAL DISPLAY DEVICE HAVING THE SAME

BACKGROUND OF THE INVENTION

1. Field of the Invention

The present invention relates to a liquid crystal display device used in a television receiver, a monitor, a display part of a mobile terminal device and the like, and a substrate for a display device used therein.

2. Description of Background Art

A production method of a conventional channel etch thin film transistor (TFT) substrate used in a transmissive liquid crystal display device is described with reference to FIGS. 24A to 24C. FIG. 24A is a cross sectional view of a pixel area of a TFT substrate, FIG. 24B is a cross sectional view of a vicinity of a terminal part 150 (gate bus line terminal), and FIG. 24C is a cross sectional view of a vicinity of a terminal part 151 (drain bus line terminal).

(1) An Al film (thickness: 150 nm) and an Mo film (thickness: 50 nm), collectively indicated by reference numerals 112, 118, 150 are formed on a transparent insulating substrate 110 by a sputtering method to form an accumulated film.

(2) A resist pattern of a gate electrode 112, a gate bus line, a storage capacity (Cs) bus line 118, a terminal 150 therefor, and necessary markings is formed by a photolithography method. Subsequently, the accumulated film is etched with a phosphoric acid Al etchant. The resist is then removed, and the substrate is rinsed.

(3) An SiN film (thickness: 400 nm) to be a gate insulating film 130, an a-Si film (thickness: 100 nm) to be an operation semiconductor film 127, and an $n^+$ a-Si film (thickness: 50 nm) to be a contact layer 129 are formed continuously in the same CVD process without breakage of vacuum to cover the accumulated electrodes including the bus lines.

(4) An island resist pattern is formed on the gate electrode 112 by a photolithography method. Thereafter, the $n^+$ a-Si film and the a-Si film are dry-etched by using a fluorine gas, such as $SF_6$ and $CF_4$, to form a contact layer and an operation semiconductor layer 127, both of which are in an island form. The resist is then removed, and the substrate is rinsed.

(5) An Mo film (thickness: 50 nm), an Al film (thickness: 150 nm), collectively indicated by reference numerals 119, 121, 122, 151 and an Mo film (thickness: 50 nm) are then formed by a sputtering method.

(6) A resist pattern is then formed by a photolithography method on an area for forming a drain bus line, a drain electrode 121, a source electrode 122, a terminal part 151 and an intermediate electrode 119. The Mo/Al/Mo film is etched with a phosphoric acid Al etchant. Subsequently, the contact layer above the channel part is removed by dry etching using a chlorine gas to isolate elements. The resist is then removed, and the substrate is rinsed. The three terminals of TFT are thus formed through the aforementioned process.

(7) An SiN film (thickness: 300 nm) as a protective film 132 is formed by a CVD method to cover the TFT.

(8) A resist pattern is formed by a photolithography method to form openings above the terminal parts 150 and 151 for the gate bus line, the Cs bus line 118 and the drain bus line, the source electrode 122 and the intermediate electrode 119. Subsequently, the protective film 132 is removed on the terminal parts 150 and 151 and the electrodes 122 and 119 to form contact holes 140, 141 and 142. Since the Mo film has no selectivity to dry etching with a fluorine gas, the Mo film is reduced in thickness. In some cases, the Al film under the Mo film is exposed. In this case, the outer peripheral parts of the contact holes 140, 141 and 142 suffer side etching due to recession of the resist pattern as described in Patent Document 1. Accordingly, the Mo film remains at the outer peripheral parts of the contact holes 140, 141 and 142, and thus ITO can be made in contact therewith at these parts. The resist is then removed, and the substrate is rinsed.

(9) An ITO film (thickness: 70 nm) as a transparent electroconductive film is formed by a sputtering method.

(10) A resist pattern is formed by a photolithography method on an area for forming a pixel electrode 116 and upper electrodes 152 and 153 for connection to cover the contact holes 141 and 142 above the terminal parts 150 and 151. Subsequently, the ITO film is etched by wet etching using an organic acid, such as oxalic acid. The resist is then removed, and the substrate is rinsed. Finally, the substrate is subjected to a heat treatment at 200° C. for about 1 hour for crystallization of the ITO film and stabilization of the TFT. After the aforementioned process, prescribed inspections for electric characteristics are carried out to complete a channel etch TFT substrate.

A production method of a conventional half tone channel etch TFT substrate used in a transmissive liquid crystal display device is described with reference to FIGS. 25A to 25C. FIG. 25A is a cross sectional view of a pixel area of a TFT substrate, FIG. 25B is a cross sectional view of a vicinity of a terminal part 150 (gate bus line terminal), and FIG. 25C is a cross sectional view of a vicinity of a terminal part 151 (drain bus line terminal).

(1) An Al film (thickness: 150 nm) and an Mo film (thickness: 50 nm), collectively indicated by reference numerals 112, 118, 150 are formed on a transparent insulating substrate 110 by a sputtering method to form an accumulated film.

(2) A resist pattern of a gate electrode 112, a gate bus line, a storage capacity (Cs) bus line 118, a terminal 150 therefor, and necessary markings is formed by a photolithography method. Subsequently, the accumulated film is etched with a phosphoric acid Al etchant. The resist is then removed, and the substrate is rinsed.

(3) An SiN film (thickness: 400 nm) to be a gate insulating film 130, an a-Si film (thickness: 100 nm) to be an operation semiconductor film 127, and an $n^+$ a-Si film (thickness: 50 nm) to be a contact layer 129 are formed continuously in the same CVD process without breakage of vacuum to cover the accumulated electrodes including the bus lines. Subsequently, an Mo film (thickness: 50 nm), an Al film (thickness: 150 nm) and an Mo film (thickness: 50 nm) are formed by a sputtering method.

(4) A resist pattern is then formed by a photolithography method on an area for forming a drain bus line intersecting the gate bus line, an intermediate electrode 119, a terminal part 151 and a TFT. An exposure mask used in this step enables half tone exposure (having an exposure amount, for example, of about half of the other exposure part) on an area between a source electrode and a drain electrode to be a channel part of the TFT. According to the half tone exposure, the cross sectional shape of the resulting resist pattern is, for example, in a staircase shape, and the thickness of the resist pattern above the channel part is smaller than the other parts.

(5) The Mo/Al/Mo film, collectively indicated by reference numerals 119, 121, 122, 151 is etched with a phosphoric acid Al etchant. Subsequently, the $n^+$ a-Si film and the a-Si film are dry-etched, and a part (upper part) of the resist pattern in a staircase shape is removed by ashing with a gas containing oxygen to expose the Mo/Al/Mo film on the area between the source electrode and the drain electrode to be the channel part of the TFT, followed by etching with the aforementioned etchant. Subsequently, the $n^+$ a-Si film on an area to be the channel part of the TFT is removed, for example, by dry etching using a chlorine gas to isolate elements. The resist is then removed, and the substrate is rinsed.

(6) The three terminals of TFT are thus formed through the aforementioned process.

(7) An SiN film (thickness: 300 nm) as a protective film 132 is formed by a CVD method to cover the TFT.

(8) A resist pattern is formed by a photolithography method to form openings above the terminal parts 150 and 151 for the gate bus line, the Cs bus line 118 and the drain bus line, the source electrode 122 and the intermediate electrode 119. Subsequently, the protective film 132 is removed on the terminal parts 150 and 151 and the electrodes 122 and 119 to form contact holes 140, 141 and 142. Since the Mo film has no selectivity to dry etching with a fluorine gas, the Mo film is reduced in thickness. In some cases, the Al film under the Mo film is exposed. In this case, the outer peripheral parts of the contact holes 140, 141 and 142 suffer side etching due to recession of the resist pattern as described in Patent Document 1. Accordingly, the Mo film remains at the outer peripheral parts of the contact holes 140, 141 and 142, and thus ITO can be made in contact therewith at these parts. The resist is then removed, and the substrate is rinsed.

(9) An ITO film (thickness: 70 nm) as a transparent electroconductive film is formed by a sputtering method.

(10) A resist pattern is formed by a photolithography method on an area for forming a pixel electrode 116 and upper electrodes 152 and 153 for connection to cover the contact holes 141 and 142 above the terminal parts 150 and 151. Subsequently, the ITO film is etched by wet etching using an organic acid, such as oxalic acid. The resist is then removed, and the substrate is rinsed. Finally, the substrate is subjected to a heat treatment at 200° C. for about 1 hour for crystallization of the ITO film and stabilization of the TFT. After the aforementioned process, prescribed inspections for electric characteristics are carried out to complete a half tone channel etch TFT substrate.

Next, a production method of a conventional channel protective film TFT substrate used in a transmissive liquid crystal display device is described with reference to FIGS. 26A to 26C. FIG. 26A is a cross sectional view of a pixel area of a TFT substrate, FIG. 26B is a cross sectional view of a vicinity of a terminal part 150 (gate bus line terminal), and FIG. 26C is a cross sectional view of a vicinity of a terminal part 151 (drain bus line terminal).

(1) An Al film (thickness: 150 nm) and an Mo film (thickness: 50 nm), collectively indicated by refernce numerals 112, 118, 150 are formed on a transparent insulating substrate 110 by a sputtering method to form an accumulated film.

(2) A resist pattern of a gate electrode 112, a gate bus line, a storage capacity (Cs) bus line 118, a terminal 150 therefor, and necessary markings is formed by a photolithography method. Subsequently, the accumulated film is etched with a phosphoric acid Al etchant. The resist is then removed, and the substrate is rinsed.

(3) An SiN film (thickness: 400 nm) to be a gate insulating film 130, an a-Si film (thickness: 100 nm) to be an operation semiconductor film 127, and an SiN film (thickness: 150 nm) to be a channel protective film 128 are formed continuously in the same CVD process without breakage of vacuum to cover the accumulated electrodes including the bus lines.

(4) An island resist pattern is then formed by a photolithography method on the gate electrode 112. The SiN film is then dry-etched by using a fluorine gas, such as $SF_6$ and $CF_4$, to form a channel protective film 128 in an island form. The resist is then removed, and the substrate is rinsed.

(5) Subsequently, after removing an oxide film on the a-Si film by using buffered hydrofluoric acid, an n+ a-Si film (thickness: 150 nm) to be a contact layer 129 is formed by a CVD method, and an Mo film (thickness: 50 nm), an Al film (thickness: 150 nm) and an Mo film (thickness: 50 nm), collectively indicated by reference numerals 119, 121, 122, 151 are formed by a sputtering method.

(6) A resist pattern is formed by a photolithography method on an area for forming a drain bus line, a drain electrode 121, a source electrode 122, a terminal part 151 and an intermediate electrode 119. The Mo/Al/Mo film is etched with a phosphoric acid Al etchant. Subsequently, the contact layer is removed by dry etching using a chlorine gas to isolate elements. The resist is then removed, and the substrate is rinsed. The three terminals of TFT are thus formed through the aforementioned process.

(7) An SiN film (thickness: 300 nm) as a protective film 132 is formed by a CVD method to cover the TFT.

(8) A resist pattern is formed by a photolithography method to form openings above the terminal parts 150 and 151 for the gate bus line, the Cs bus line 118 and the drain bus line, the source electrode 122 and the intermediate electrode 119. Subsequently, the protective film 132 is removed on the terminal parts 150 and 151 and the electrodes 122 and 119 to form contact holes 140, 141 and 142. Since the Mo film has no selectivity to dry etching with a fluorine gas, the Mo film is reduced in thickness. In some cases, the Al film under the Mo film is exposed. In this case, the outer peripheral parts of the contact holes 140, 141 and 142 suffer side etching due to recession of the resist pattern as described in Patent Document 1. Accordingly, the Mo film remains at the outer peripheral parts of the contact holes 140, 141 and 142, and thus ITO can be made in contact therewith at these parts. The resist is then removed, and the substrate is rinsed.

(9) An ITO film (thickness: 70 nm) as a transparent electroconductive film is formed by a sputtering method.

(10) A resist pattern is formed by a photolithography method on an area for forming a pixel electrode 116 and upper electrodes 152 and 153 for connection to cover the contact holes 141 and 142. Subsequently, the ITO film is etched by wet etching using an organic acid, such as oxalic acid. The resist is then removed, and the substrate is rinsed. Finally, the substrate is subjected to a heat treatment at 200° C. for about 1 hour for crystallization of the ITO film and stabilization of the TFT. After the aforementioned process, prescribed inspections for electric characteristics are carried out to complete a channel protective film TFT substrate.

A production method of a conventional channel etch TFT substrate used in a reflective liquid crystal display device is described with reference to FIGS. 27A to 27C. FIG. 27A is a cross sectional view of a pixel area of a TFT substrate, FIG. 27B is a cross sectional view of a vicinity of a terminal part 150 (gate bus line terminal), and FIG. 27C is a cross sectional view of a vicinity of a terminal part 151 (drain bus line terminal).

After effecting the steps (1) to (8) of the production method of a transmissive channel etch TFT substrate, upper electrodes 152 and 153 are formed with a transparent electroconductive film on the terminal parts 150 and 151. A transparent pixel electrode 116 is not formed herein as being different from the transmissive TFT substrate. Thereafter, protrusions 160 for forming irregularity are partially formed within the pixel area, and an organic film 161 is formed over the entire protrusions 160 for forming irregularity. Irregularity is formed on the organic film 161 corresponding to the protrusions 160 for forming irregularity. Instead of the protrusions 160 for forming irregularity, some kind of underlying structures for forming irregularity may be formed in the steps (1) to (8).

An Mo/Al film is then formed by a sputtering method. A resist pattern is formed by a photolithography method on an area for forming a reflective electrode 117. The Mo/Al film is then wet-etched to form a reflective electrode 117. The reflective electrode 117 is patterned into a large size to overlap the gate bus line and the drain bus line. An Al single layer film is not used but an Mo film is used as an underlayer because the Mo film has such a function of a buffer film that prevents the upper electrodes 152 and 153 (ITO) above the terminal parts 150 and 151 and the Al layer from disappearing due to a battery effect in a developing step in the photolithography method. The production method of a reflective TFT substrate requires at least four electrode process steps including a gate process step for forming the gate electrode 112, a source/drain process step for forming the drain electrode 121 and the source electrode 122, a terminal process step for forming the upper electrodes 152 and 153, and a reflective electrode process step for forming the reflective electrode 117.

As having been described, the conventional liquid crystal display device has such a problem that the production methods thereof are complicated.

Patent Document 1: JP-A-2000-77666
Patent Document 2: JP-A-6-291318
Patent Document 3: JP-A-2003-57638

SUMMARY OF THE INVENTION

An object of the invention is to provide such a substrate for a display device that can be obtained by a simple production method with high reliability, and a liquid crystal display device having the same. Another object of the invention is to provide such a liquid crystal display device that is excellent in display characteristics, and a substrate for a display device used therefor.

The above objects of the invention are accomplished by a substrate for a display device, the substrate containing: an accumulated electrode having an accumulated structure containing a lower layer formed on a substrate, and a upper layer containing ZnO and formed on the lower layer; an insulating film covering the accumulated electrode; a contact hole opening in the insulating film on the accumulated electrode; and a pixel electrode formed on the insulating film and being connected directly to the upper layer of the accumulated electrode through the contact hole.

In the substrate for a display device of the invention, the substrate for a display device further contains a terminal part formed in the same layer as the accumulated electrode; and a contact hole opening in the insulating film on the terminal part.

In the substrate for a display device of the invention, the lower layer and the upper layer are patterned in substantially the same shape.

In the substrate for a display device of the invention, the lower layer and the upper layer are formed in the same photolithography process.

In the substrate for a display device of the invention, the lower layer contains Al or an Al alloy.

The above objects of the invention are also accomplished by a display device containing a pair of substrate facing each other and a liquid crystal sealed between the pair of substrates, one of the pair of substrates being the substrate for a display device according to the invention.

According to the invention, such a substrate for a display device can be realized that can be obtained by a simple production method with high reliability, and a liquid crystal display device having the same can also be realized.

BRIEF DESCRIPTION OF THE DRAWINGS

FIGS. 25A to 25C are cross sectional views showing a conventional TFT substrate;

FIGS. 26A to 26C are cross sectional views showing a conventional TFT substrate; and FIGS. 27A to 27C are cross sectional views showing a conventional TFT substrate.

DESCRIPTION OF THE PREFERRED EMBODIMENTS

First Embodiment

Example 1-1

Figure 1:
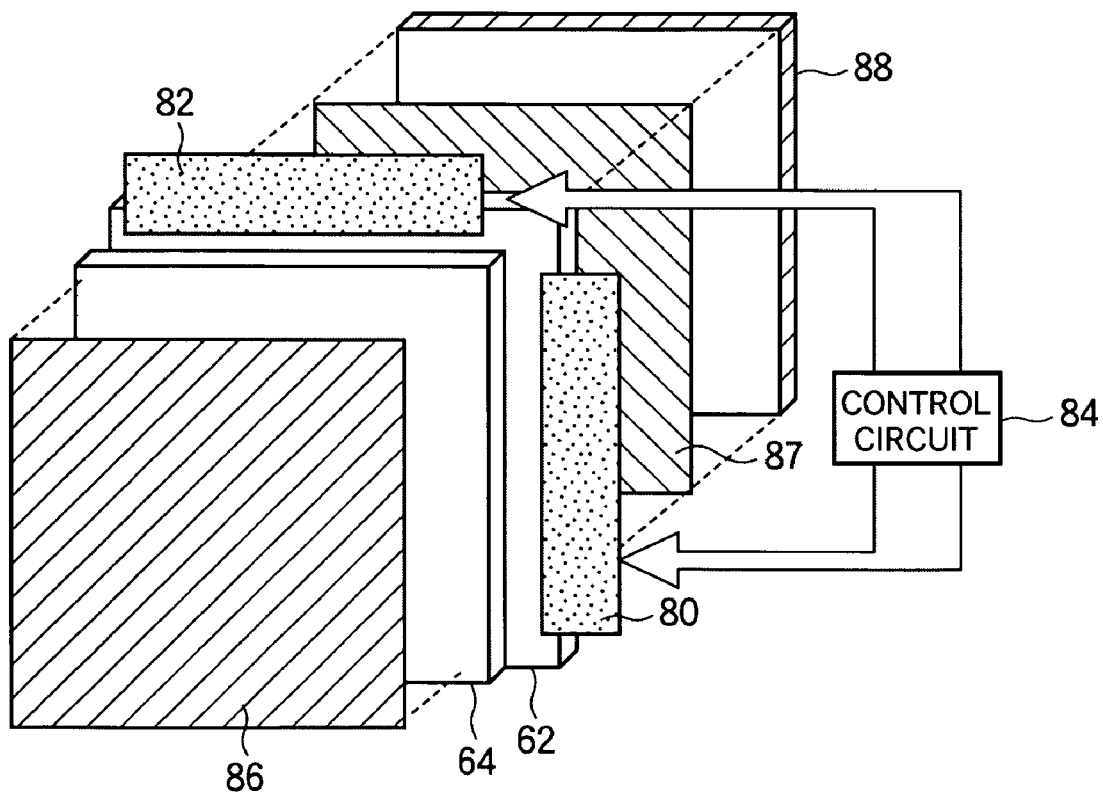
FIG. 1 is a diagram showing a schematic constitution of a liquid crystal display device according to Example 1-1 of the first embodiment of the invention.

A substrate for a display device according to Example 1-1 of the first embodiment of the invention and a display device having the same will be described with reference to FIG. 1. FIG. 1 is a diagram showing a schematic constitution of a transmissive liquid crystal display device according to this example. As shown in FIG. 1, the liquid crystal display device has a gate bus line, a drain bus line, and a TFT substrate (substrate for a display device) 62 having a thin film transistor (TFT) and a pixel electrode for each pixel. The liquid crystal display device also has a counter substrate 64 having a color filter (CF) and a common electrode and disposed to face the TFT substrate 62. A liquid crystal is sealed between the substrates 62 and 64 to form a liquid crystal layer.

The TFT substrate 62 is connected to a gate bus line driving circuit 80 having mounted therein a driver IC for driving a plurality of gate bus lines and a drain bus line driving circuit 82 having mounted therein a driver IC for driving a plurality of drain bus lines. The driving circuits 80 and 82 output a scanning signal or a data signal to the prescribed gate bus line or drain bus line based on the prescribed signal output from a control circuit 84. A polarizing plate 87 is disposed on a surface of the TFT substrate 62 opposite to the surface having TFT elements formed thereon, and a polarizing plate 86 is disposed on a surface of the counter substrate 64 opposite to the surface having the common electrode formed thereon to form a crossed nicols with the polarizing plate 87. A backlight unit 88 is provided on a surface of the polarizing plate 87 opposite to the side of the TFT substrate 62.

Figure 2:
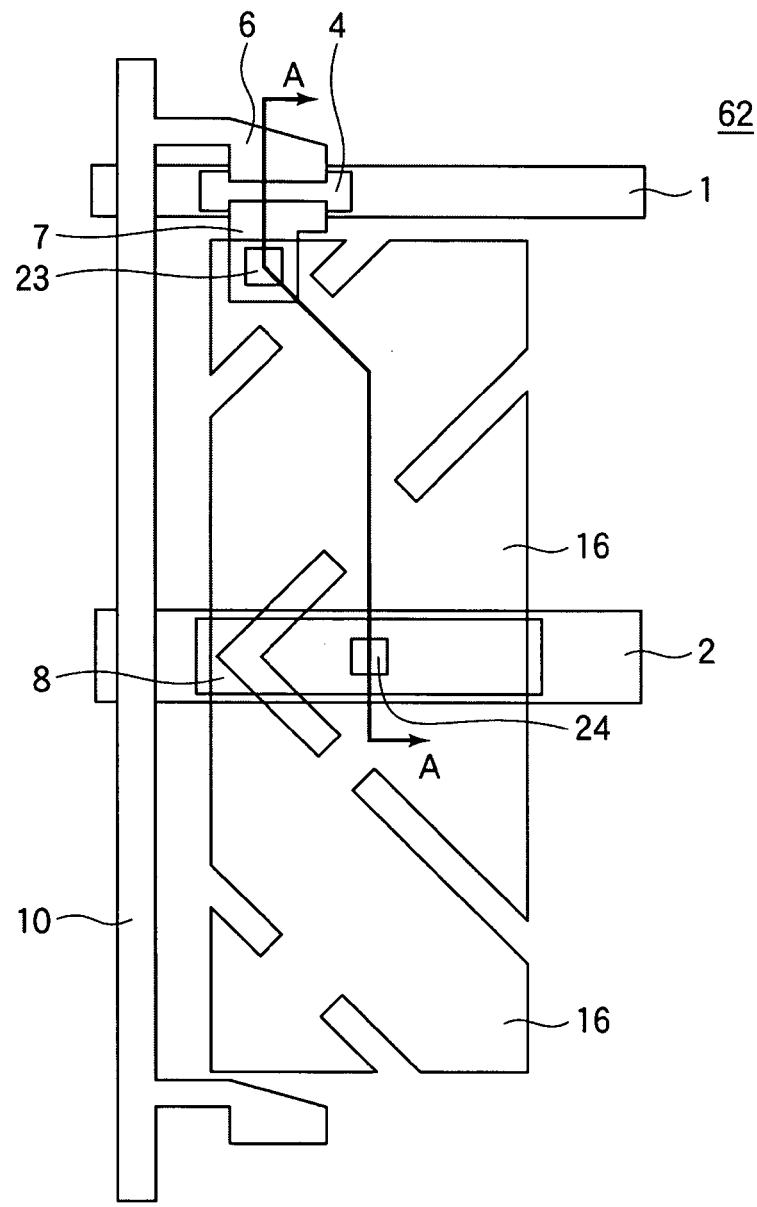
FIG. 2 is a diagram showing a constitution of one pixel of a TFT substrate according to Example 1-1 of the first embodiment of the invention.
Figure 3:
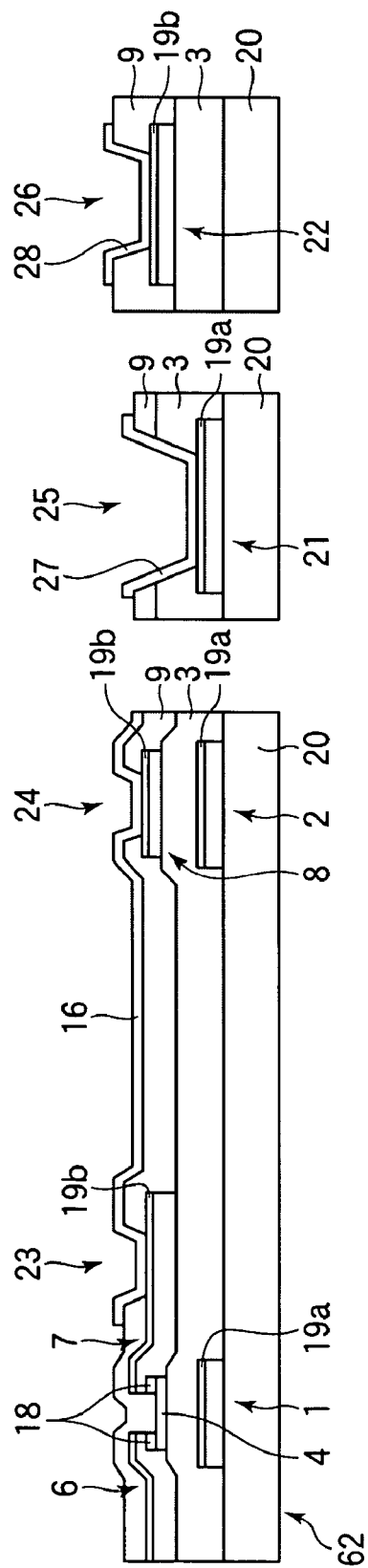
FIGS. 3A to 3C are cross sectional views showing a constitution of a TFT substrate according to Example 1-1 of the first embodiment of the invention.

The constitution and the production method of the TFT substrate 62 will be described. FIG. 2 is a diagram showing the constitution of one pixel of the TFT substrate 62 according to this example. FIG. 3A is a cross sectional view of the TFT substrate 62 on line A-A in FIG. 2, FIG. 3B is a cross sectional view showing the constitution of a vicinity of a gate bus line terminal, and FIG. 3C is a cross sectional view showing the constitution of a vicinity of a drain bus line terminal. The gate bus line (gate electrode) 1 and the drain bus line 10 formed in the TFT substrate 62 according to this example each have an accumulated structure containing a lower layer containing a low resistance metal, such as Al and an Al alloy, and an upper layer formed on the lower layer and containing a ZnO film (for example, a ZnO film containing 2% by weight of Al) 19a or 19b. The lower layer and the upper layer are formed in the same photolithography process and patterned in substantially the same shape.

The TFT substrate 62 is produced in the following process steps.

(1) An Al film (thickness: 150 nm) and a ZnO film containing 2% by weight of Al (thickness: 50 nm) are formed in this order on a transparent insulating substrate 20 by a sputtering method to form an accumulated film.

(2) A resist pattern of a gate bus line (gate electrode) 1, a Cs bus line 2, a lower electrode (terminal part) 21 of a terminal therefor, and necessary markings is formed by a photolithography method. Subsequently, the accumulated film is etched with a phosphoric acid Al etchant. The resist is then removed, and the substrate is rinsed. According to the procedure, the gate bus line 1, the Cs bus line 2, the lower electrode 21 and markings are formed.

(3) An SiN film (thickness: 400 nm) to be a gate insulating film 3, an a-Si film (thickness: 100 nm) to be an operation semiconductor film 4, and an n$^+$ a-Si film (thickness: 50 nm) to be a contact layer 18 are formed continuously in the same CVD process without breakage of vacuum to cover the accumulated electrodes including the bus lines.

(4) An island resist pattern is formed on the gate electrode 1 by a photolithography method. Thereafter, the n$^+$ a-Si film and the a-Si film are dry-etched by using a fluorine gas, such as SF$_6$ and CF$_4$, to form a contact layer 18 and an operation semiconductor layer 4, both of which are in an island form. The resist is then removed, and the substrate is rinsed.

(5) An Mo film (thickness: 50 nm), an Al film (thickness: 150 nm) and a ZnO film containing 2% by weight of Al (thickness: 50 nm) are then formed in this order by a sputtering method.

(6) A resist pattern is then formed by a photolithography method on an area for forming a drain bus line 10, a drain electrode 6, a source electrode 7, a lower electrode 22 of the drain bus line terminal and an intermediate electrode 8. The Mo/Al/ZnO film is etched with a phosphoric acid Al etchant. Subsequently, the contact layer 18 above the channel part is removed by dry etching using a chlorine gas to isolate elements. The resist is then removed, and the substrate is rinsed. According to the procedure, the drain bus line 10, the drain electrode 6, the source electrode 7, the lower electrode 22 and the intermediate electrode 8 are formed. The three terminals of TFT are thus formed through the aforementioned process.

(7) An SiN film (thickness: 300 nm) as a protective film 9 is formed by a CVD method to cover the TFT.

(8) A resist pattern is formed by a photolithography method to form openings above the lower electrodes 21 and 22 of the bus line terminals, the source electrode 7 and the intermediate electrode 8. Subsequently, the protective film 9 (and the insulating film 3) are removed on the lower electrodes 21 and 22 and the electrodes 7 and 8 to form contact holes 23, 24, 25 and 26. Since the ZnO films 19a and 19b have selectivity to dry etching with a fluorine gas, the films are not reduced in thickness. The resist is then removed, and the substrate is rinsed.

(9) An ITO film (thickness: 70 nm) as a transparent electroconductive film is formed thereon by a sputtering method.

(10) A resist pattern is formed by a photolithography method on an area for forming a pixel electrode (transparent electrode) 16 and upper electrodes 27 and 28 for connection to cover the contact holes 25 and 26 above the lower electrodes 21 and 22. Subsequently, the ITO film is etched by wet etching using an organic acid, such as oxalic acid. The resist is then removed, and the substrate is rinsed. According to the procedure, a pixel electrode 16 and upper electrodes 27 and 28 are formed. Finally, the substrate is subjected to a heat treatment at 200° C. for about 1 hour for crystallization of the ITO film and stabilization of the TFT. After the aforementioned process, prescribed inspections for electric characteristics are carried out to complete a TFT substrate 62.

Among the parts where electric connection is made to the outside or within the TFT substrate 62, the gate bus line terminal and the Cs bus line terminal have such a structure that the ZnO film 19a as an upper layer of the lower electrode 21 is connected directly with the upper electrode (ITO) 27 formed simultaneously with the pixel electrode 16 through the contact hole 25 opening in the insulating film 3 and the protective film 9. The drain bus line terminal has such a structure that the ZnO film 19b as an upper layer of the lower electrode 22 is connected directly with the upper electrode (ITO) 28 formed simultaneously with the pixel electrode 16 through the contact hole 26 opening in the protective film 9. The ZnO film 19b as an upper layer of the source electrode 7 is connected directly with the pixel electrode (ITO) 16 through the contact hole 23, and the ZnO film 19b as an upper layer of the intermediate electrode 8 is connected directly with the pixel electrode 16 through the contact hole 24.

Example 1-2

Figure 4:
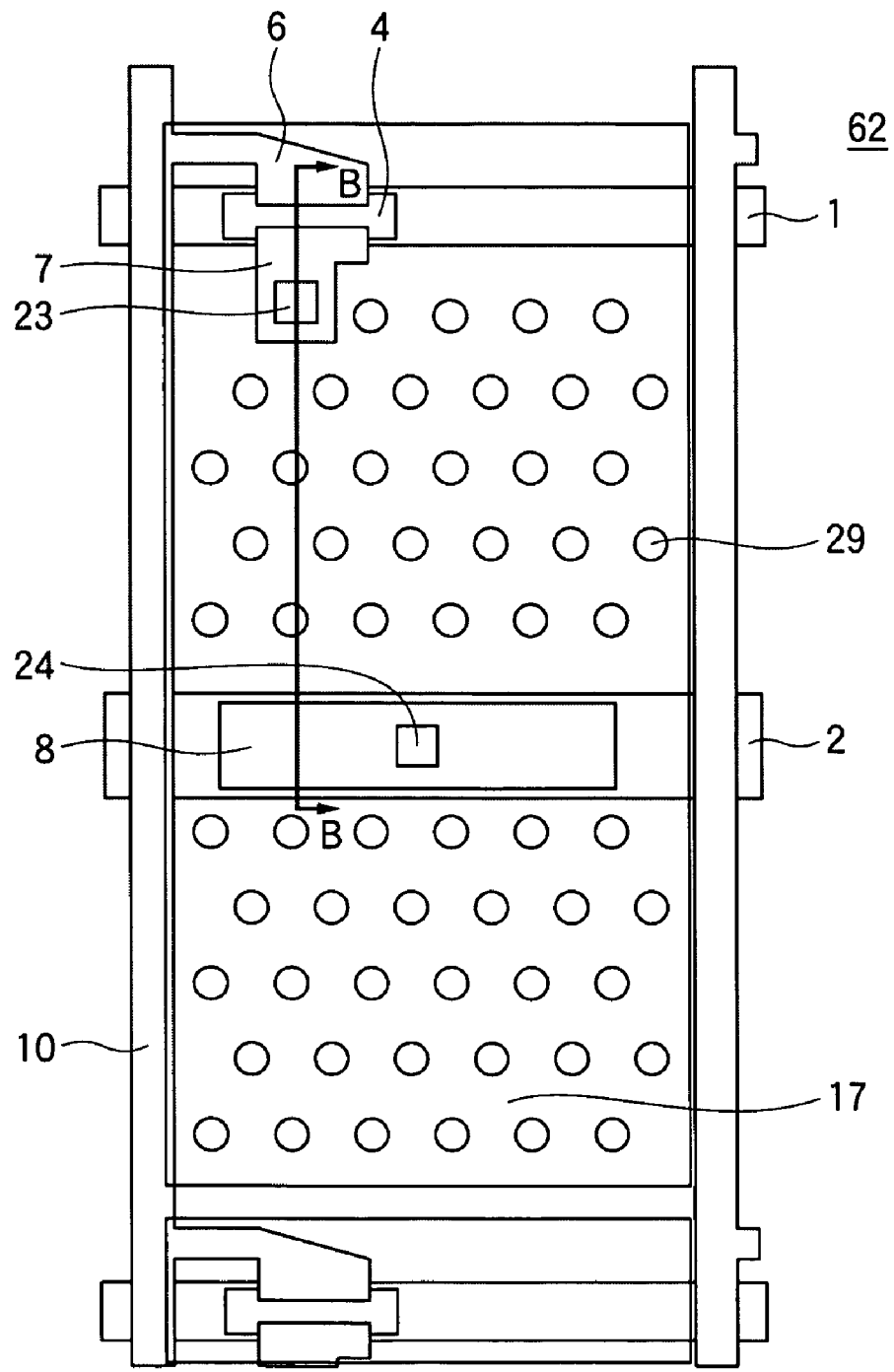
FIG. 4 is a diagram showing a constitution of one pixel of a TFT substrate according to Example 1-2 of the first embodiment of the invention.
Figure 5:
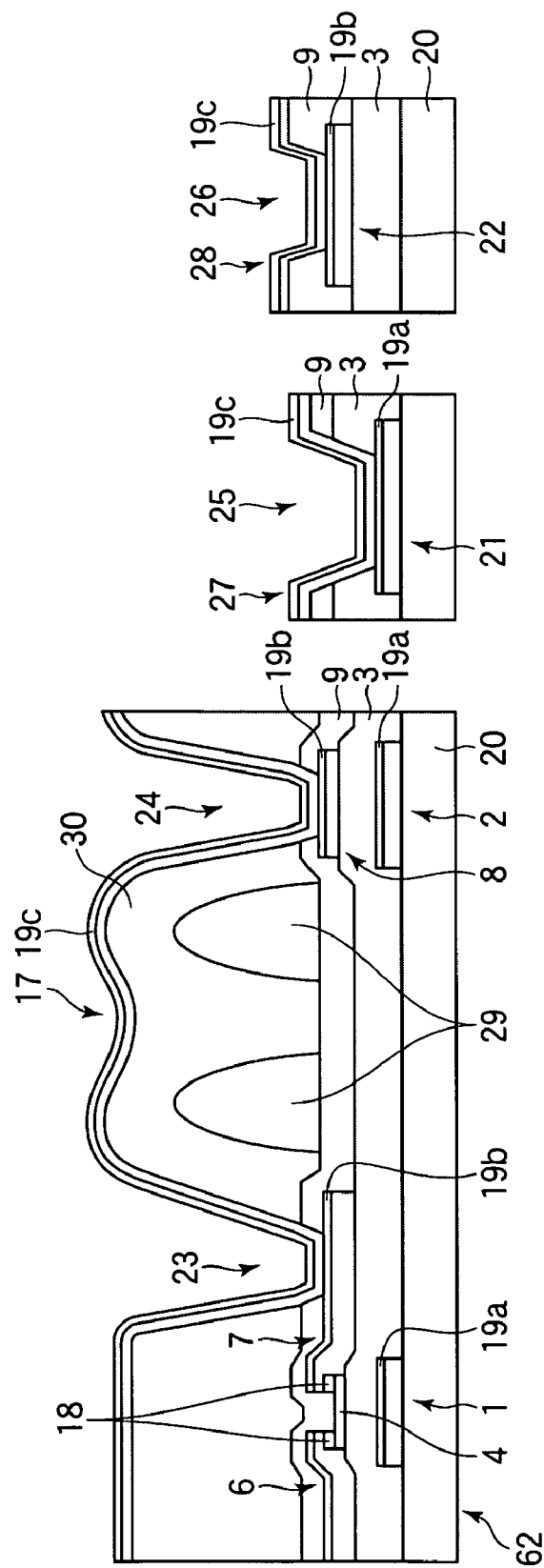
FIGS. 5A to 5C are cross sectional views showing a constitution of a TFT substrate according to Example 1-2 of the first embodiment of the invention.

A reflective TFT substrate 62 according to Example 1-2 of the embodiment and a production method thereof will be described. FIG. 4 is a diagram showing a constitution of one pixel of the TFT substrate 62 of this example. FIG. 5A is a cross sectional view of the TFT substrate 62 on line B-B in FIG. 4, FIG. 5B is a cross sectional view showing the constitution of a vicinity of a gate bus line terminal, and FIG. 5C is a cross sectional view showing the constitution of a vicinity of a drain bus line terminal. In the TFT substrate 62 of this example, a reflective electrode (pixel electrode) 17 and upper electrodes 27 and 28 of the bus line terminal have a two-layer structure having an Al film as a lower layer and a ZnO film 19c as an upper layer.

The TFT substrate 62 is produced in the following process steps.

(1) An Al film (thickness: 150 nm) and a ZnO film containing 2% by weight of Al (thickness: 50 nm) are formed in this order on a transparent insulating substrate 20 by a sputtering method to form an accumulated film.

(2) A resist pattern of a gate bus line (gate electrode) 1, a Cs bus line 2, a lower electrode (terminal part) 21 of a terminal therefor, and necessary markings is formed by a photolithography method. Subsequently, the accumulated film is etched with a phosphoric acid Al etchant. The resist is then removed, and the substrate is rinsed. According to the procedure, the gate bus line 1, the Cs bus line 2, the lower electrode 21 and markings are formed.

(3) An SiN film (thickness: 400 nm) to be a gate insulating film 3, an a-Si film (thickness: 100 nm) to be an operation semiconductor film 4, and an n$^+$ a-Si film (thickness: 50 nm) to be a contact layer 18 are formed continuously in the same CVD process without breakage of vacuum to cover the accumulated electrodes including the bus lines.

(4) An island resist pattern is formed on the gate electrode 1 by a photolithography method. Thereafter, the n$^+$ a-Si film and the a-Si film are dry-etched by using a fluorine gas, such as $SF_6$ and $CF_4$, to form a contact layer 18 and an operation semiconductor layer 4, both of which are in an island form. The resist is then removed, and the substrate is rinsed.

(5) An Mo film (thickness: 50 nm), an Al film (thickness: 150 nm) and a ZnO film containing 2% by weight of Al (thickness: 50 nm) are then formed in this order by a sputtering method.

(6) A resist pattern is then formed by a photolithography method on an area for forming a drain bus line 10, a drain electrode 6, a source electrode 7, a lower electrode 22 of the drain bus line terminal and an intermediate electrode 8. The Mo/Al/ZnO film is etched with a phosphoric acid Al etchant. Subsequently, the contact layer 18 above the channel part is removed by dry etching using a chlorine gas to isolate elements. The resist is then removed, and the substrate is rinsed. According to the procedure, the drain bus line 10, the drain electrode 6, the source electrode 7, the lower electrode 22 and the intermediate electrode 8 are formed. The three terminals of TFT are thus formed through the aforementioned process.

(7) An SiN film (thickness: 300 nm) as a protective film 9 is formed by a CVD method to cover the TFT.

(8) A resist pattern is formed by a photolithography method to form openings above the lower electrodes 21 and 22 of the bus line terminals, the source electrode 7 and the intermediate electrode 8. Subsequently, the protective film 9 (and the insulating film 3) are removed on the lower electrodes 21 and 22 and the electrodes 7 and 8 to form contact holes 23, 24, 25 and 26. Since the ZnO films 19a and 19b have selectivity to dry etching with a fluorine gas, the films are not reduced in thickness. The resist is then removed, and the substrate is rinsed. Protrusions 29 for forming irregularity are formed partially within the pixel area. Subsequently, an organic film 30 is formed over the entire protrusions 29 for forming irregularity, and the organic film 30 on the area where the contact holes 23 and 24 are formed and in the vicinity of the terminal part is removed by patterning. Irregularity is formed on the organic film 30 that corresponds in some extent to the protrusions 29 for forming irregularity.

(9) An Al film (thickness: 150 nm) as a reflective electroconductive film and a ZnO film containing 2% by weight of Al (thickness: 50 nm) are then formed thereon in this order by a sputtering method.

(10) A resist pattern is formed by a photolithography method on an area for forming a reflective electrode 17 and upper electrodes 27 and 28 for connection to cover the contact holes 25 and 26 above the lower electrodes 21 and 22. Subsequently, the reflective electroconductive film is etched by wet etching using a phosphoric acid etchant. The resist is then removed, and the substrate is rinsed. According to the procedure, a reflective electrode 17 and upper electrodes 27 and 28 are formed. The reflective electrode 17 and the upper electrodes 27 and 28 have a ZnO film 19c as upper layers. The surface of the reflective electrode 17 has irregularity corresponding to the organic film 30 as an underlayer. Finally, the substrate is subjected to a heat treatment at 200° C. for about 1 hour for stabilization of the TFT. After the aforementioned process, prescribed inspections for electric characteristics are carried out to complete a TFT substrate 62.

Among the parts where electric connection is made to the outside or within the TFT substrate 62, the gate bus line terminal and the Cs bus line terminal have such a structure that the ZnO film 19a as an upper layer of the lower electrode 21 is connected directly with the lower layer (Al) of the upper electrode 27 (Al/ZnO film) formed simultaneously with the reflective electrode 17 through the contact hole 25 opening in the insulating film 3 and the protective film 9. The drain bus line terminal has such a structure that the ZnO film 19b as an upper layer of the lower electrode 22 is connected directly with the lower layer (Al) of the upper electrode 28 (Al/ZnO film) formed simultaneously with the reflective electrode 17 through the contact hole 26 opening in the protective film 9. The uppermost layers of the bus line terminals are the ZnO films 19c, which are oxide electroconductive films. The ZnO film 19b as an upper layer of the source electrode 7 is connected directly with the lower layer (Al) of the reflective electrode 17 (Al/ZnO film) through the contact hole 23, and the ZnO film 19b as an upper layer of the intermediate electrode 8 is connected directly with the lower layer (Al) of the reflective electrode 17 through the contact hole 24.

Accordingly, the uppermost layers of the bus line terminals are the ZnO films 19c, which are oxide electroconductive films, and therefore, the electroconductivity is maintained even though the surface of the terminal is oxidized, whereby terminals with high reliability can be obtained.

Example 1-3

Figure 6:
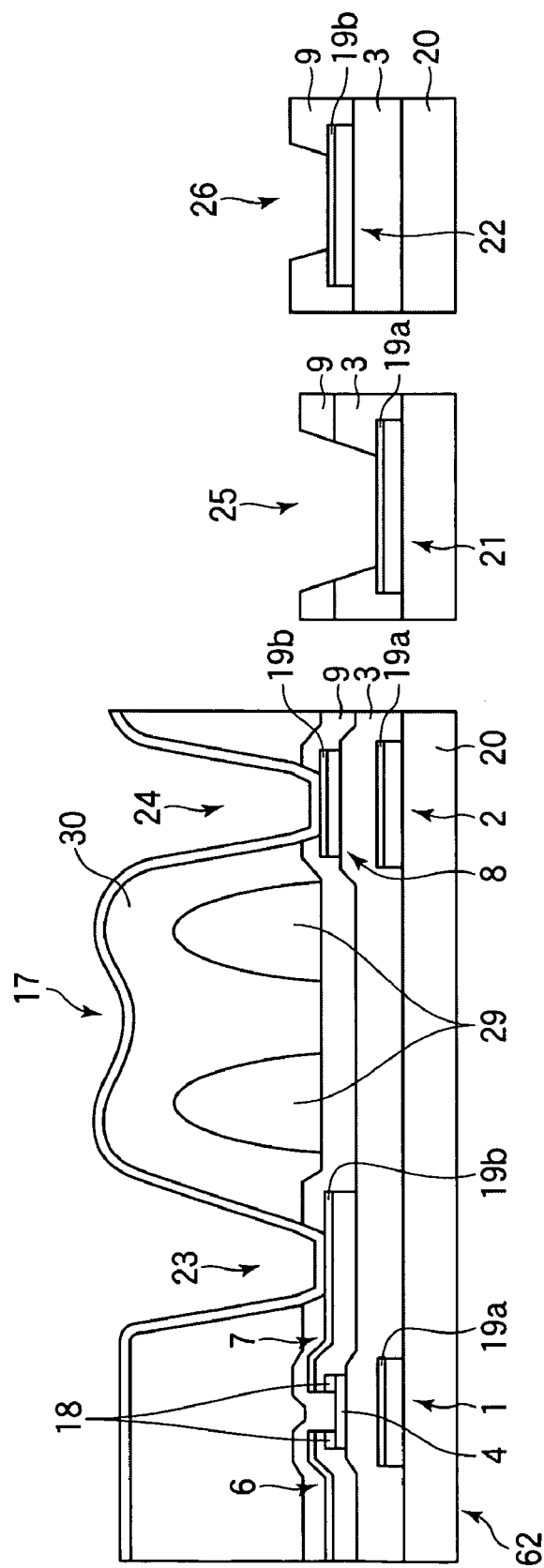
FIGS. 6A to 6C are cross sectional views showing a constitution of a TFT substrate according to Example 1-3 of the first embodiment of the invention.

A reflective TFT substrate 62 according to Example 1-3 of the embodiment and a production method thereof will be described. FIG. 6A is a cross sectional view of the TFT substrate 62, FIG. 6B is a cross sectional view showing the constitution of a vicinity of a gate bus line terminal, and FIG. 6C is a cross sectional view showing the constitution of a vicinity of a drain bus line terminal. In this example, a bus line terminal is formed only of a lower electrode, and the lower electrode has a two-layer structure having an Al film as a lower layer and a ZnO film as an upper layer.

The TFT substrate 62 is produced in the following process steps.

(1) An Al film (thickness: 150 nm) and a ZnO film containing 2% by weight of Al (thickness: 50 nm) are formed in this order on a transparent insulating substrate 20 by a sputtering method to form an accumulated film.

(2) A resist pattern of a gate bus line (gate electrode) 1, a Cs bus line 2, a lower electrode 21 of a terminal therefor, and necessary markings is formed by a photolithography method. Subsequently, the accumulated film is etched with a phosphoric acid Al etchant. The resist is then removed, and the substrate is rinsed. According to the procedure, the gate bus line 1, the Cs bus line 2, the lower electrode 21 and markings are formed.

(3) An SiN film (thickness: 400 nm) to be a gate insulating film 3, an a-Si film (thickness: 100 nm) to be an operation semiconductor film 4, and an n$^+$ a-Si film (thickness: 50 nm) to be a contact layer 18 are formed continuously in the same CVD process without breakage of vacuum to cover the accumulated electrodes including the bus lines.

(4) An island resist pattern is formed on the gate electrode 1 by a photolithography method. Thereafter, the n$^+$ a-Si film and the a-Si film are dry-etched by using a fluorine gas, such as $SF_6$ and $CF_4$, to form a contact layer 18 and an operation semiconductor layer 4, both of which are in an island form. The resist is then removed, and the substrate is rinsed.

(5) An Mo film (thickness: 50 nm), an Al film (thickness: 150 nm) and a ZnO film containing 2% by weight of Al (thickness: 50 nm) are then formed by a sputtering method.

(6) A resist pattern is then formed by a photolithography method on an area for forming a drain bus line 10, a drain electrode 6, a source electrode 7, a lower electrode 22 of the drain bus line terminal and an intermediate electrode 8. The Mo/Al/ZnO film is etched with a phosphoric acid Al etchant. Subsequently, the contact layer 18 above the channel part is removed by dry etching using a chlorine gas to isolate elements. The resist is then removed, and the substrate is rinsed. According to the procedure, the drain bus line 10, the drain electrode 6, the source electrode 7, the lower electrode 22 and the intermediate electrode 8 are formed. The three terminals of TFT are thus formed through the aforementioned process.

(7) An SiN film (thickness: 300 nm) as a protective film 9 is formed by a CVD method to cover the TFT.

(8) A resist pattern is formed by a photolithography method to form openings above the lower electrodes 21 and 22 of the bus line terminals, the source electrode 7 and the intermediate electrode 8. Subsequently, the protective film 9 (and the insulating film 3) are removed on the lower electrodes 21 and 22 and the electrodes 7 and 8 to form contact holes 23, 24, 25 and 26. Since the ZnO films 19a and 19b have selectivity to dry etching with a fluorine gas, the films are not reduced in thickness. The resist is then removed, and the substrate is rinsed. Protrusions 29 for forming irregularity are formed partially within the pixel area. Subsequently, an organic film 30 is formed over the entire protrusions 29 for forming irregularity, and the organic film 30 on the area where the contact holes 23 and 24 are formed and in the vicinity of the terminal part is removed by patterning. Irregularity is formed on the organic film 30 that corresponds in some extent to the protrusions 29 for forming irregularity.

(9) An Al film (thickness: 150 nm) as a reflective electroconductive film is then formed thereon by a sputtering method.

(10) A resist pattern is formed by a photolithography method on an area for forming a reflective electrode 17. Subsequently, the reflective electroconductive film is etched by dry etching using a chlorine gas. The lower electrodes 21 and 22 of the terminal parts have the ZnO films 19a and 19b as upper layers. Since the ZnO films 19a and 19b have resistance to dry etching, the films are not reduced in thickness. The resist is then removed, and the substrate is rinsed. According to the procedure, a reflective electrode 17 is formed in each pixel. The surface of the reflective electrode 17 has irregularity corresponding to the organic film 30 as an underlayer. Finally, the substrate is subjected to a heat treatment at 200° C. for about 1 hour for stabilization of the TFT. After the aforementioned process, prescribed inspections for electric characteristics are carried out to complete a TFT substrate 62.

Among the parts where electric connection is made to the outside or within the TFT substrate 62, the gate bus line terminal and the Cs bus line terminal have such a structure that the ZnO film 19a as an upper layer of the lower electrode 21 is exposed through the contact hole 25 opening in the insulating film 3 and the protective film 9. The drain bus line terminal has such a structure that the ZnO film 19b as an upper layer of the lower electrode 22 is exposed through the contact hole 26 opening in the protective film 9. The uppermost layer of the bus line terminal is the ZnO film 19a or 19b, which is an oxide electroconductive film. The ZnO film 19b as an upper layer of the source electrode 7 is connected directly with the reflective electrode 17 (Al film) through the contact hole 23, and the ZnO film 19b as an upper layer of the intermediate electrode 8 is connected directly with the reflective electrode 17 (Al film) through the contact hole 24.

Accordingly, the uppermost layer of the bus line terminal is the ZnO films 19a or 19b, which is an oxide electroconductive film, and therefore, the electroconductivity is maintained even though the surface of the terminal is oxidized, whereby terminals with high reliability can be obtained. In this example, the terminals can be formed only with three photolithography steps (i.e., with three masks) including the gate process step for forming the lower electrode 21, the drain process step for forming the lower electrode 22, and the terminal process step for forming the contact holes 25 and 26.

Example 1-4

Figure 7:
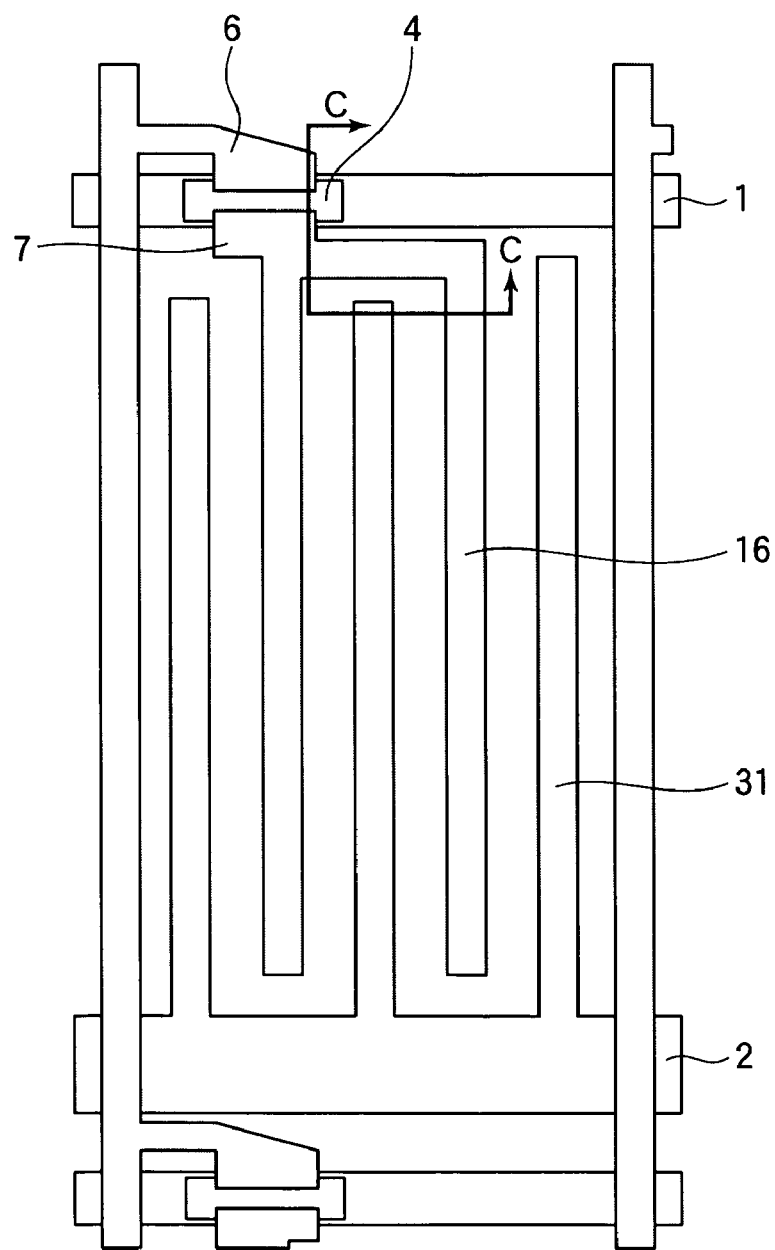
FIG. 7 is a diagram showing a constitution of one pixel of a TFT substrate according to Example 1-4 of the first embodiment of the invention.
Figures 8A, 8B, 8C:
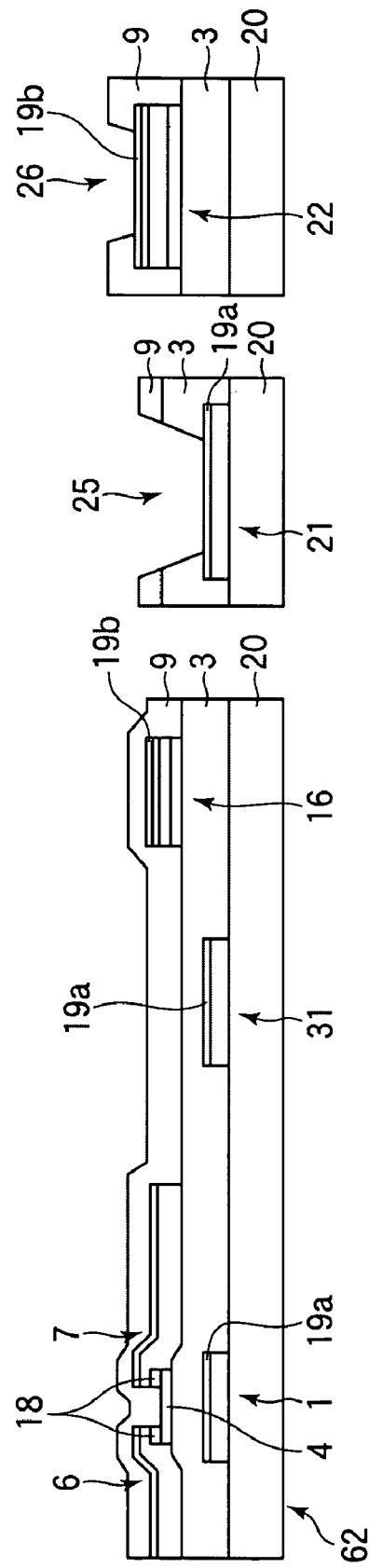
FIGS. 8A to 8C are cross sectional views showing a constitution of a TFT substrate according to Example 1-4 of the first embodiment of the invention.

A reflective TFT substrate 62 according to Example 1-4 of the embodiment and a production method thereof will be described. FIG. 7 is a diagram showing a constitution of one pixel of the TFT substrate 62 of this example. FIG. 8A is a cross sectional view of the TFT substrate 62 on line C-C in FIG. 7, FIG. 8B is a cross sectional view showing the constitution of a vicinity of a gate bus line terminal, and FIG. 8C is a cross sectional view showing the constitution of a vicinity of a drain bus line terminal. The TFT substrate 62 of this example is used in a liquid crystal display device of an IPS mode where a liquid crystal is driven with a lateral electric field. In this example, a low resistance circuit having oxide electroconductive film terminals can be obtained with three masks.

The TFT substrate 62 is produced in the following process steps.

(1) An Al film (thickness: 150 nm) and a ZnO film containing 2% by weight of Al (thickness: 50 nm) are formed in this order on a transparent insulating substrate 20 by a sputtering method to form an accumulated film.

(2) A resist pattern of a gate bus line (gate electrode) 1, a Cs bus line 2, a lower electrode 21 of a terminal therefor, a common electrode 31 and necessary markings is formed by a photolithography method. Subsequently, the accumulated film is etched with a phosphoric acid Al etchant. The resist is then removed, and the substrate is rinsed. According to the procedure, the gate bus line 1, the Cs bus line 2, the lower electrode 21, the common electrode 31 and markings are formed. The common electrode 31 is branched from the Cs bus line 2 and is formed in an interdigitated shape facing a pixel electrode 16 having an interdigitated shape formed in a later step, with a prescribed gap.

(3) An SiN film (thickness: 400 nm) to be a gate insulating film 3, an a-Si film (thickness: 100 nm) to be an operation semiconductor film 4, and an $n^+$ a-Si film (thickness: 50 nm) to be a contact layer 18 are formed continuously in the same CVD process without breakage of vacuum to cover the accumulated electrodes including the bus lines.

(4) An island resist pattern is formed on the gate electrode 1 by a photolithography method. Thereafter, the $n^+$ a-Si film and the a-Si film are dry-etched by using a fluorine gas, such as $SF_6$ and $CF_4$, to form a contact layer 18 and an operation semiconductor layer 4, both of which are in an island form. The resist is then removed, and the substrate is rinsed.

(5) An Mo film (thickness: 50 nm), an Al film (thickness: 150 nm) and a ZnO film containing 2% by weight of Al (thickness: 50 nm) are then formed by a sputtering method.

(6) A resist pattern is then formed by a photolithography method on an area for forming a drain bus line 10, a drain electrode 6, a source electrode 7, a pixel electrode 16 and a lower electrode 22 of the drain bus line terminal. The Mo/Al/ZnO film is etched with a phosphoric acid Al etchant. Subsequently, the contact layer 18 above the channel part is removed by dry etching using a chlorine gas to isolate elements. The resist is then removed, and the substrate is rinsed. According to the procedure, the drain bus line 10, the drain electrode 6, the source electrode 7, the pixel electrode 16 and the lower electrode 22 are formed. The pixel electrode 16 is formed in an interdigitated shape corresponding to the common electrode 31 having been formed in the former step. The three terminals of TFT are thus formed through the aforementioned process.

(7) An SiN film (thickness: 300 nm) as a protective film 9 is formed by a CVD method to cover the TFT.

(8) A resist pattern is formed by a photolithography method to form openings above the lower electrodes 21 and 22 of the bus line terminals. Subsequently, the protective film 9 (and the insulating film 3) is removed on the lower electrodes 21 and 22 to form contact holes 25 and 26. Since the ZnO films 19a and 19b have selectivity to dry etching with a fluorine gas, the films are not reduced in thickness. The resist is then removed, and the substrate is rinsed. A TFT substrate 62 is thus completed through the aforementioned procedure.

Among the parts where electric connection is made to the outside or within the TFT substrate 62, the gate bus line terminal and the Cs bus line terminal have such a structure that the ZnO film 19a as an upper layer of the lower electrode 21 is exposed through the contact hole 25 opening in the insulating film 3 and the protective film 9. The drain bus line terminal has such a structure that the ZnO film 19b as an upper layer of the lower electrode 22 is exposed through the contact hole 26 opening in the protective film 9. The uppermost layers of the bus line terminals are the ZnO films 19a and 19b, which are oxide electroconductive films.

Accordingly, the uppermost layer of the bus line terminal is the ZnO films 19a or 19b, which is an oxide electroconductive film, and therefore, the electroconductivity is maintained even though the surface of the terminal is oxidized, whereby terminals with high reliability can be obtained. In this example, the terminals can be formed only with three photolithography steps (i.e., with three masks) including the gate process step for forming the lower electrode 21, the drain process step for forming the lower electrode 22, and the terminal process step for forming the contact holes 25 and 26.

As having been described, according to the embodiment of the invention, terminals with high reliability owing to the upper layer formed of an oxide electroconductive film, and low resistance circuits owing to the lower layer formed of Al can be obtained through a simple production method.

Second Embodiment

A substrate for a display device according to the second embodiment of the invention and a display device having the same will be described with reference to FIGS. 9 to 23. The embodiment relates particularly to a transflective liquid crystal display device and a substrate for a display device used therein.

Liquid crystal display devices are being used widely as a display part of a personal computer, a television receiver, a mobile terminal device and the like. Among these, a transflective liquid crystal display device, which can utilize both backlight and outside light for display, can display images in both outdoor spaces with intense sunlight and relatively dark indoor spaces, and is becoming the mainstream of a display device used in a mobile terminal device and the like.

Figure 9:
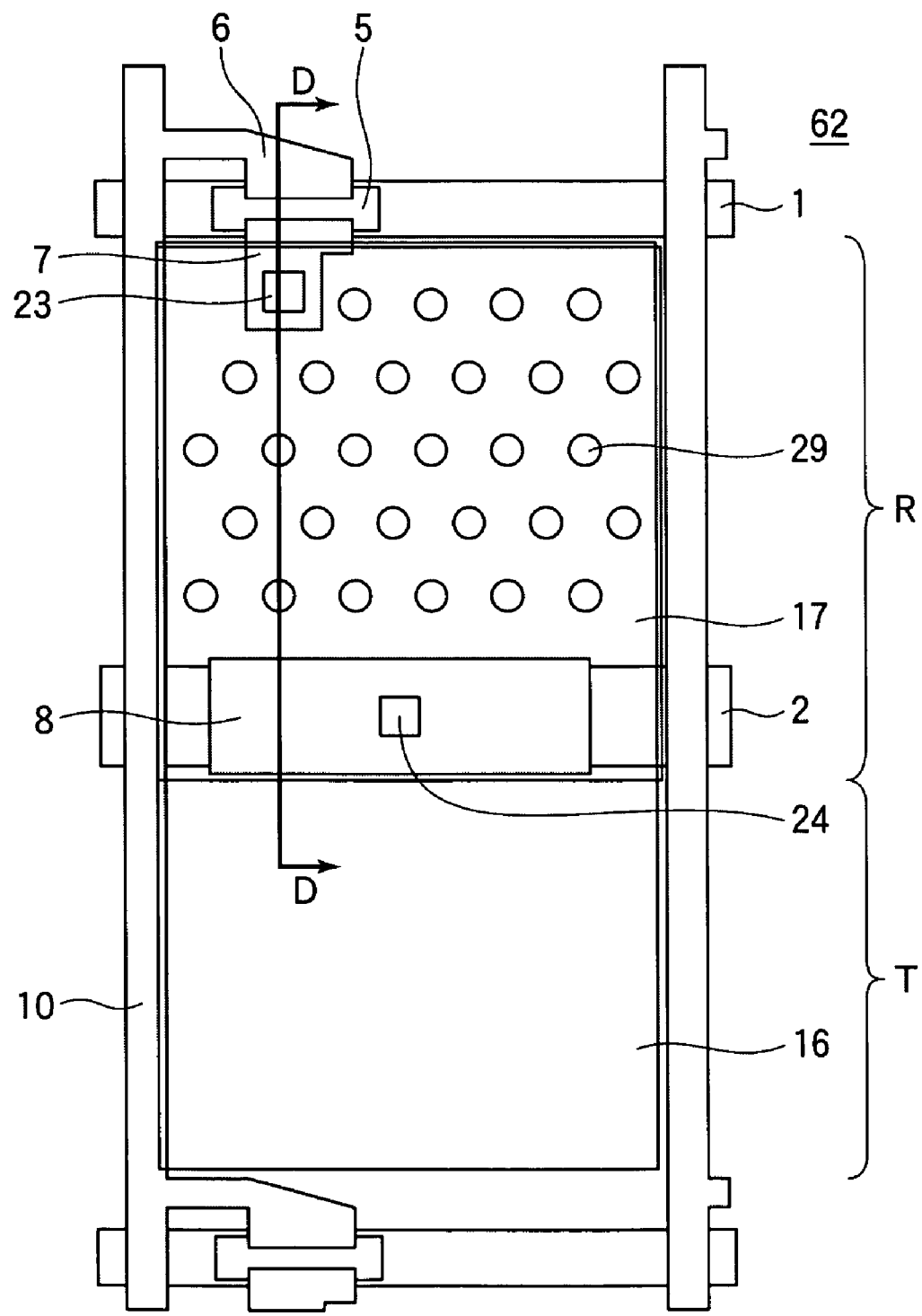
FIG. 9 is a diagram showing a constitution of a conventional TFT substrate, which is a basis for the second embodiment of the invention.
Figure 10:
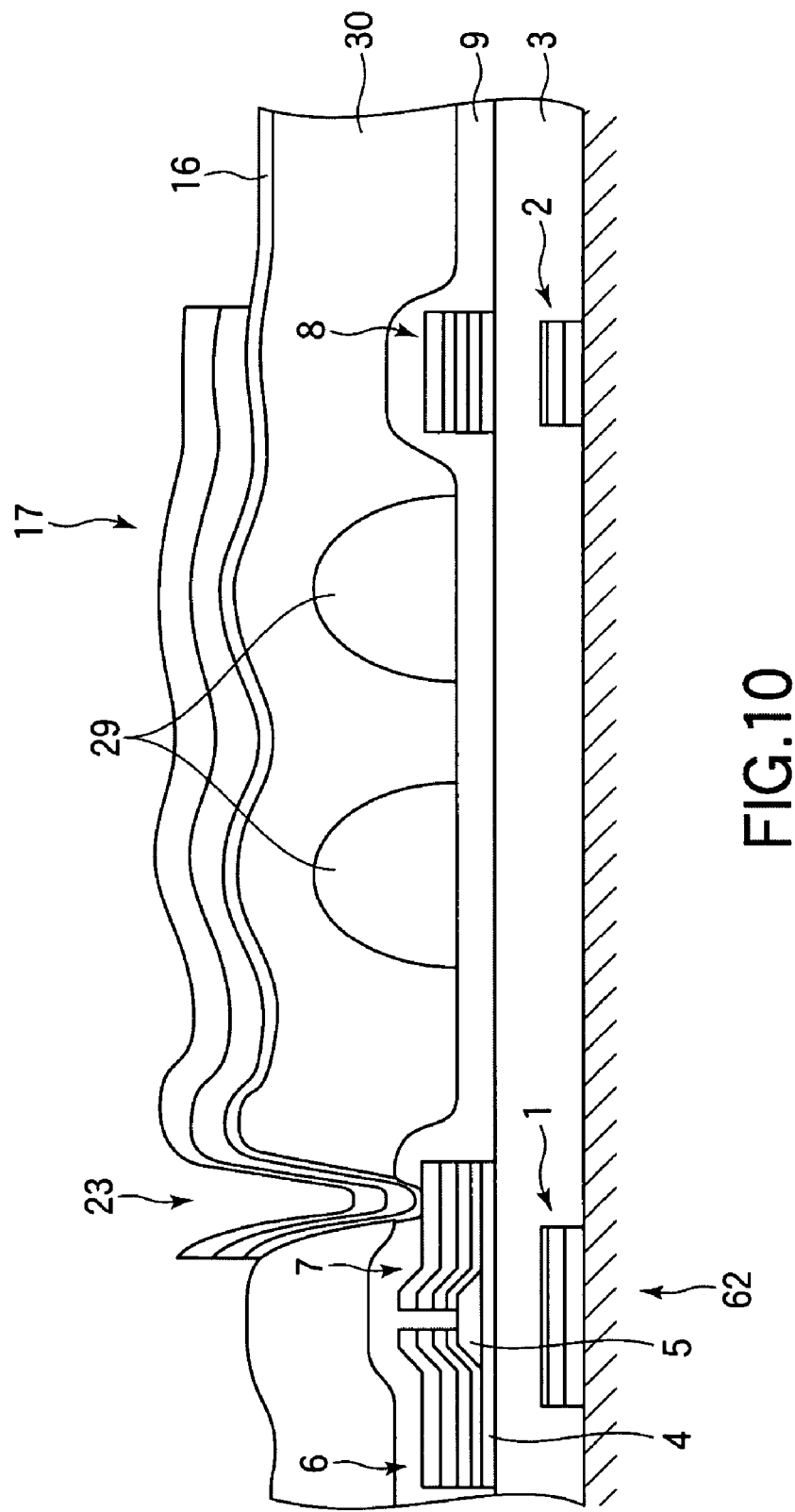
FIG. 10 is a cross sectional view showing a constitution of a conventional TFT substrate, which is a basis for the second embodiment of the invention.

FIG. 9 is a diagram showing the constitution of one pixel of a conventional transflective TFT substrate 62, and FIG. 10 is a cross sectional view of the TFT substrate 62 on line D-D in FIG. 9. As shown in FIGS. 9 and 10, the pixel area is divided into a reflective area R and a transmission area T. A transparent electrode 16 formed of a transparent electroconductive film, such as ITO, is formed in the transmission area T. In the reflective area R, the transparent electrode 16 and a reflective electrode 17 formed of Al or the like for reflecting outside light accumulated on the transparent electrode 16 are formed. In the reflective area R, irregularity is formed in advance on the underlayer of the transparent electrode 16 to form irregularity on the surface of the reflection electrode 17 on the transparent electrode 16. According to the constitution, incident light is reflected as reflected light so that reflection directions of the reflected light are moderately dispersed from specific direction.

A mobile terminal device, such as a mobile phone and PDA, is often used individually. Therefore, the display screen of the device is viewed from the anterior direction, from which the display can be viewed under the best conditions. In the case where the display device is in an environment with intense sunlight, however, the sunlight is far more intense than the backlight of the display device, and thus the contrast of the display submerges in the environmental light to impair the view. On the other hand, a reflective or transflective liquid crystal display device is suitable for that case, and a user can view a clear displayed image by utilizing sunlight. Accordingly, it is the best way for using a reflective or transflective liquid crystal display device in a bright environment that the display device is irradiated with sunlight from the anterior direction, and the display screen is viewed from the anterior direction.

Figure 11:
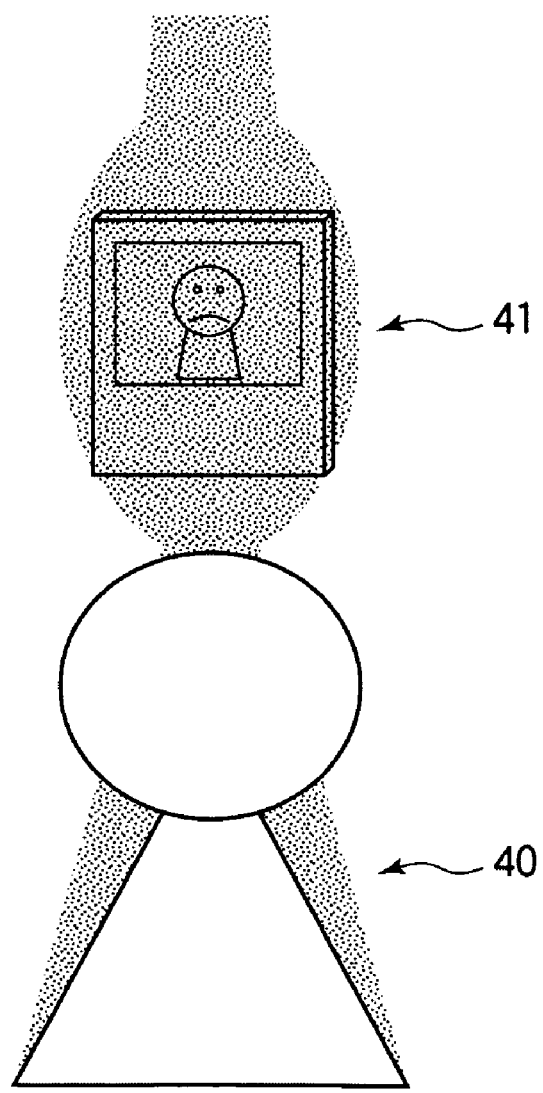
FIG. 11 is a diagram showing a positional relationship between a user and a display screen.
Figure 12:
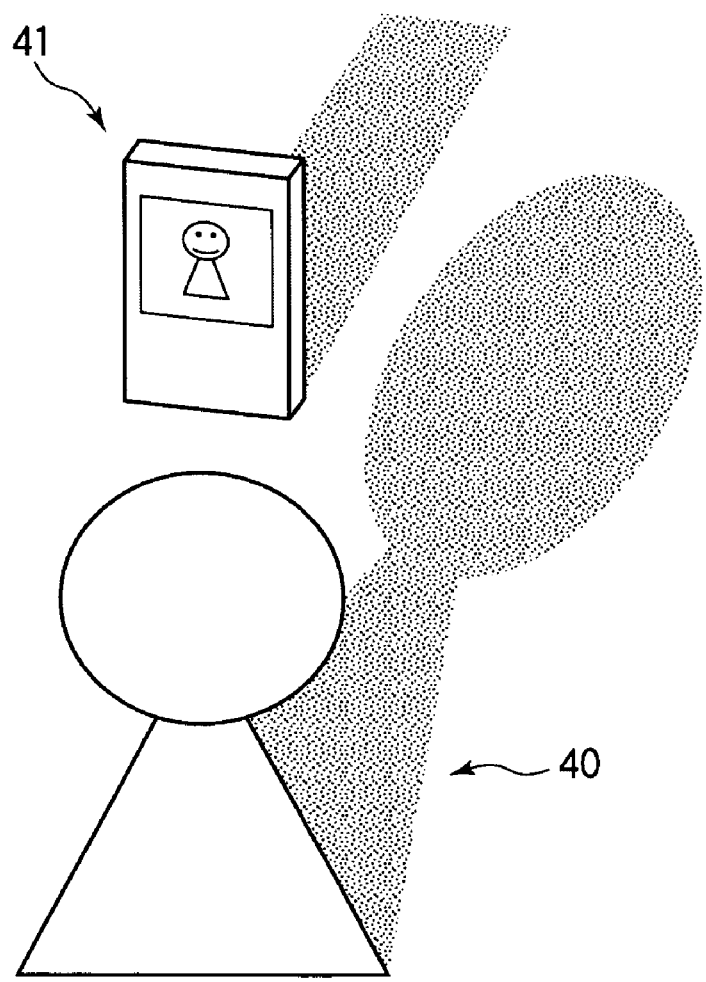
FIG. 12 is a diagram showing a positional relationship between a user and a display screen.

FIGS. 11 and 12 are diagrams showing positional relationships between a user and a display screen of a mobile terminal device. As shown in FIG. 11, the user 40 is irradiated with sunlight backward, the display screen of the mobile terminal device 41 is in a shadow of the user 40 and cannot well utilize the sunlight for display. Accordingly, it is necessary that the user 40 changes the directions and positions of the mobile terminal device 41 and the user 40 upon viewing the display screen as shown in FIG. 12. However, the display characteristics of the liquid crystal display device is generally poor upon viewing obliquely, and the display cannot be viewed under the best conditions in the positional relationship shown in FIG. 12. Particularly, in the case where the mobile terminal device is used in an automobile or a train where the presence of sunlight and the positional relationship between the sun, the user and the mobile terminal device alter every second, it is difficult to obtain good display characteristics, which brings about disadvantages.

A transflective liquid crystal display device provides clear display in both outdoor spaces and indoor spaces by compensating disadvantages of reflective display and transmissive display, but the pixel area necessarily has not only a reflective area R but also a transmission area T. Accordingly, a transflective liquid crystal display device has a narrower reflective area R than a reflective liquid crystal display device and has a problem of difficulty in improvement of the reflective characteristics. Therefore, there is a demand of improvement in pixel design for obtaining effective reflective characteristics.

An object of the embodiment is to provide such a transflective liquid crystal display device that provides good display characteristics, and a substrate for a display device used therein.

The above object of the embodiment is accomplished by a substrate for a display device, the substrate containing: a resin layer having an irregular surface formed on a transparent substrate; a pixel electrode having an irregular surface corresponding to the surface of the resin layer and having such a structure that a transparent electrode transmitting light and a reflective electrode reflecting light are accumulated at least in part; and a plurality of pixel areas each having a reflective area having the transparent electrode and the reflective electrode accumulated, and a transmission area where the reflective electrode is removed on an area corresponding to a top, a bottom or both of the top and bottom of the irregular pixel electrode.

In the substrate for a display device of the embodiment, the resin layer is transparent.

In the substrate for a display device of the embodiment, the transmission area is disposed on an area where an oblique angle of the surface of the resin layer is 6° or less with respect to the substrate.

In the substrate for a display device of the embodiment, the transparent electrode contains ITO, $ZnO_x$, or a compound containing $ZnO_x$ added with Al or Ga.

In the substrate for a display device of the embodiment, the reflective electrode has an accumulated structure containing at least two layers containing a lower layer containing Mo, Mo containing nitrogen, or Ti, and an upper layer containing Al, an Al alloy, Ag, or an Ag alloy.

In the substrate for a display device of the embodiment, the transparent electrode contains $ZnO_x$, or a compound containing $ZnO_x$ added with Al or Ga, and the reflective electrode contains a single layer containing Al, an Al alloy, Ag, or an Ag alloy.

The above object of the embodiment is also accomplished by a liquid crystal display device containing a pair of substrate facing each other and a liquid crystal sealed between the pair of substrates, one of the pair of substrates being the substrate for a display device according to the embodiment.

According to the embodiment, such a transflective liquid crystal display device that provides good display characteristics, and a substrate for a display device used therein can be realized.

In a transflective liquid crystal display device of this embodiment, the pixel electrode has an accumulated structure containing a transparent electrode and a reflective electrode formed as an upper layer on at least a part of the transparent electrode, and an open area transmitting light by removing the reflective electrode is provided on an area corresponding to a top, a bottom or both of the top and bottom of the irregularity of the pixel electrode (or the underlayer thereof). The open area has only the transparent electrode as the pixel electrode. In this embodiment, an area having the area with the reflective electrode and the open area mixed therein is referred to as a transflective area TR. In microscopic view, the transflective area TR has both the reflective area R having the reflective electrode formed thereon and the open area as the transmission area T. In other words, the area corresponding to a top, a bottom or both of the top and bottom of the irregularity functions as the transmission area T, and the other area functions as the reflective area R. Since the transparent electrode remains in the open area, the pixel potential is maintained by the transparent electrode. In order to transmit light from a backlight unit through the open area, a transparent resin or a resin having been bleached to be transparent is used in the resin layer as the underlayer of the reflective electrode. While both the transflective area TR and the transmission area T may be provided within the pixel, the entire pixel area may be formed only with the transflective area TR when sufficient transmission characteristics can be obtained by the transflective area TR.

Figure 13:
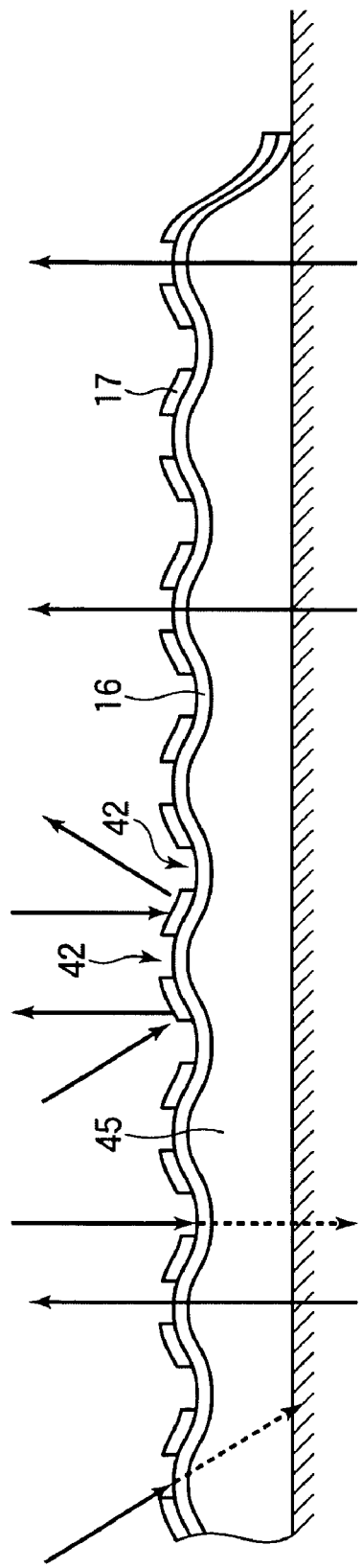
FIG. 13 is a schematic cross sectional view showing a TFT substrate for describing a function of the second embodiment of the invention.
Figure 14:
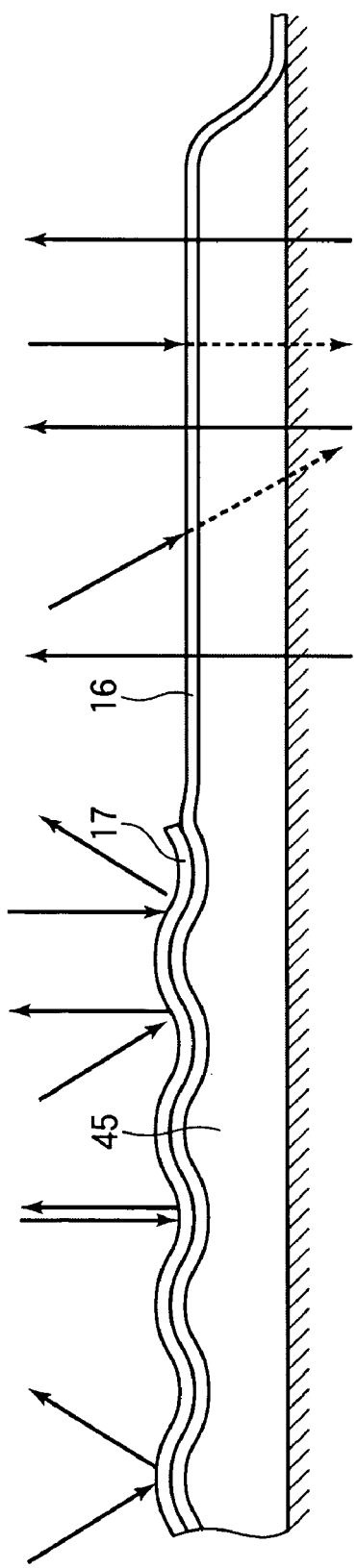
FIG. 14 is a schematic cross sectional view of a conventional transflective TFT substrate.

FIG. 13 is a schematic cross sectional view showing a TFT substrate for describing the function of the embodiment, and FIG. 14 is a schematic cross sectional view of a conventional transflective TFT substrate for comparison with the embodiment. In an ordinary reflective or transflective liquid crystal display device, the reflectivity of the reflective electrode is an important index of the performance thereof. However, due to the aforementioned problems, the reflectivity to incident light at an oblique angle of about 30° with respect to the anterior direction is important rather than the anterior-anterior reflectivity (i.e., the ratio of intensity of reflected light to the anterior direction with respect to incident light in the anterior direction).

Figure 15:
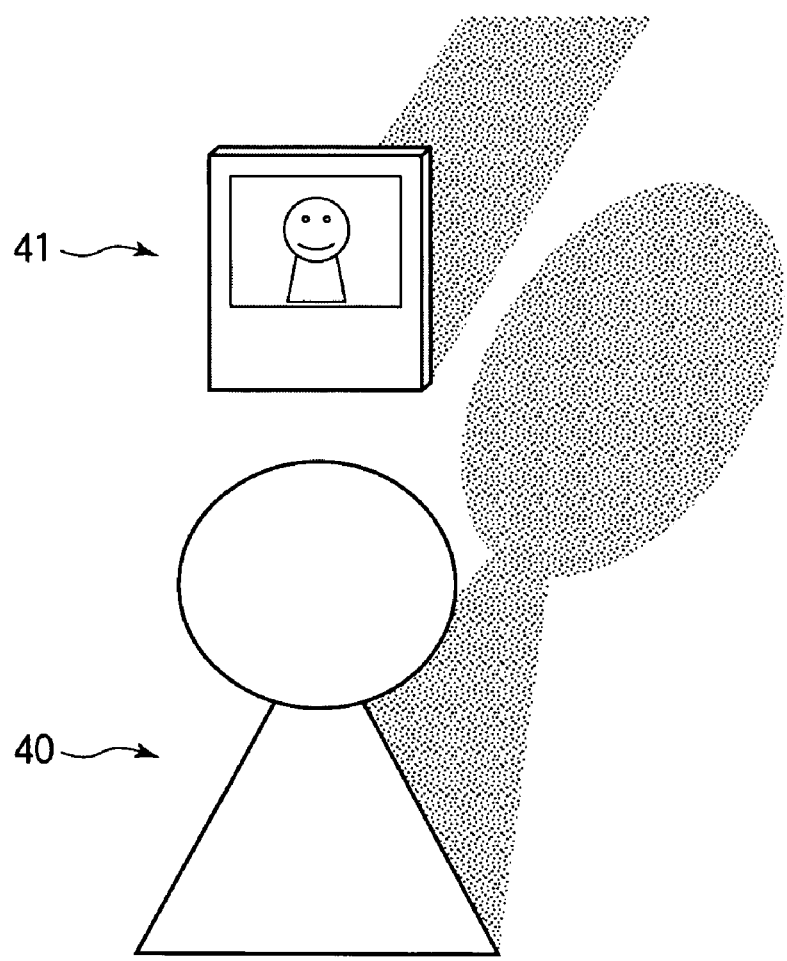
FIG. 15 is a diagram showing a positional relationship between a user and a display screen.
Figure 16:
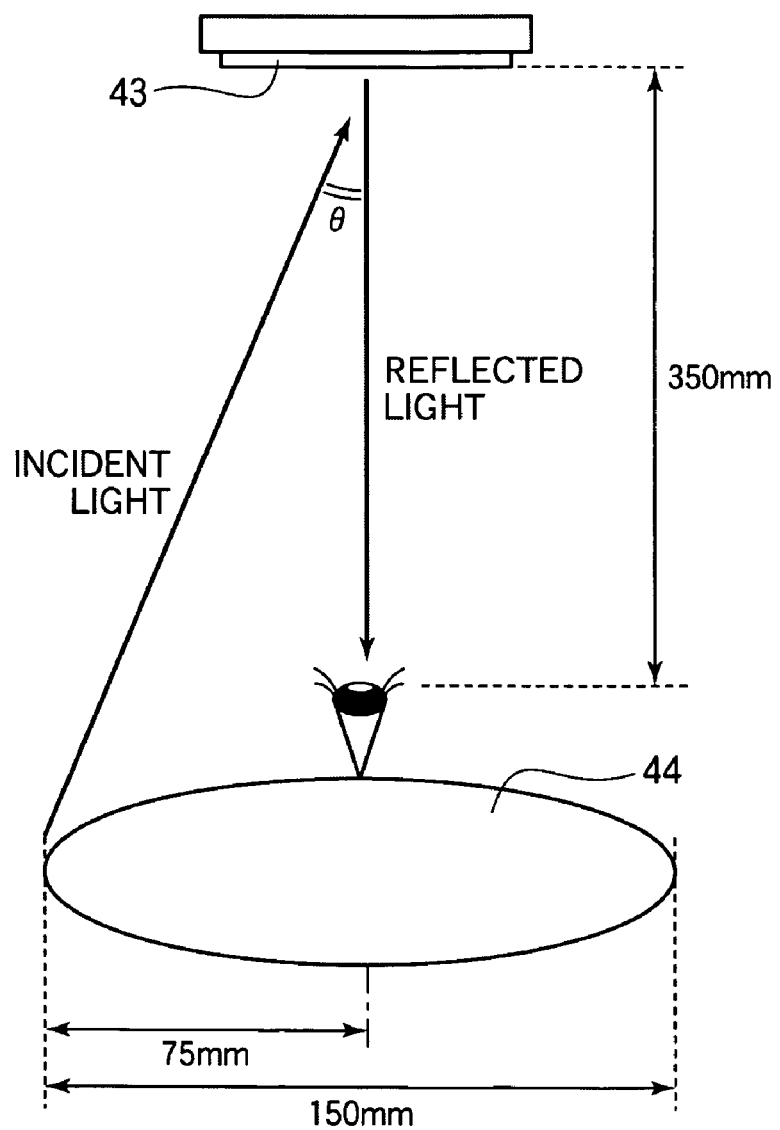
FIG. 16 is a diagram showing a principle of the second embodiment of the invention.

In the conventional constitution shown in FIG. 14, the surface of the reflective electrode 17 in the reflective area of the pixel has irregularity corresponding to the resin layer 45 as the underlayer. However, on an area corresponding to the top or bottom of the irregularity, light obliquely incident at an angle of about 30° is reflected to an angle of about −30°, which does not contribute to reflection in the anterior direction, but contributes to the anterior-anterior reflection and oblique-oblique reflection. In the constitution of the embodiment shown in FIG. 13, the open area 42 is formed by removing the reflective electrode 17 on the area to use the area as the transmission area. According to the constitution, the area can be efficiently utilized to improve the substantial aperture ratio. Furthermore, the transflective area may be enhanced by enjoining the improvement in aperture ratio to improve the reflective characteristics. According to the constitution, a larger amount of light incident in an oblique direction of the display screen can be reflected to the anterior direction (normal direction) of the display screen. Therefore, as shown in FIG. 15, light incident in the obliquely backward direction of the user 40 can be efficiently utilized to obtain reflective display in good conditions.

The open area 42 is provided preferably on an area where an oblique angle ($\geqq 0°$) of the irregular surface is 6° or less with respect to the direction in parallel to the substrate, which is assumed to be 0°. The basis of the constitution will be described with reference to FIGS. 16 and 17. Upon viewing a mobile terminal device having a liquid crystal display device 43, a user often holds the mobile terminal device at such a position that the eyes of the user are positioned in the anterior direction (normal direction) of the display screen of the liquid crystal display device 43. In this case, the distance between the display screen and the eyes is about 35 cm while it varies depending on individuals and circumstances. Such a case will be considered herein that the head 44 of the user is positioned between the light source such as the sun and the display screen, and the head 44 intercepts incident light. Assuming that the head 44 of the user has a width of 15 cm, the maximum angle $\theta$ ($0° \leqq \theta < 90°$) of interception of the light incident on the display screen by the head 44 is expressed by the following equation with the normal direction of the display screen being 0°:

$$\theta = a\tan((150\ (mm)/2)/350\ (mm)) = 12.09°$$

Figure 17:
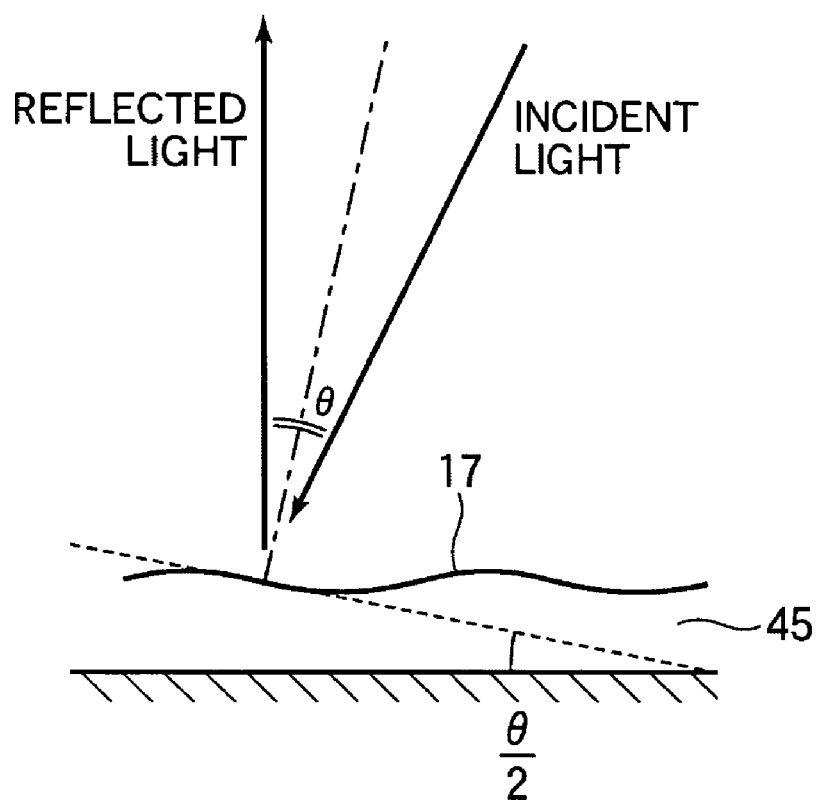
FIG. 17 is a diagram showing a principle of the second embodiment of the invention.

As shown in FIG. 17 the oblique angle of the micro-surface of the reflective electrode 17 reflecting the incident light in the normal direction of the display screen is ½ of the incident angle of the light. Accordingly, in the reflective electrode 17, an area having an oblique angle of $\theta/2$ ($\approx 6°$) or less little contributes to the display based on the positional relationship of the light source, the display screen and the user. Therefore, it is preferred that the open area 42 is formed on an area where the oblique angle of the surface of the reflective electrode 17 (if it is formed) is 6° or less with respect to the substrate (i.e., an area where the oblique angle of the surface of the resin layer 45 or the surface of the transparent electrode 16 is 6° or less).

Example 2-1

Figure 18:
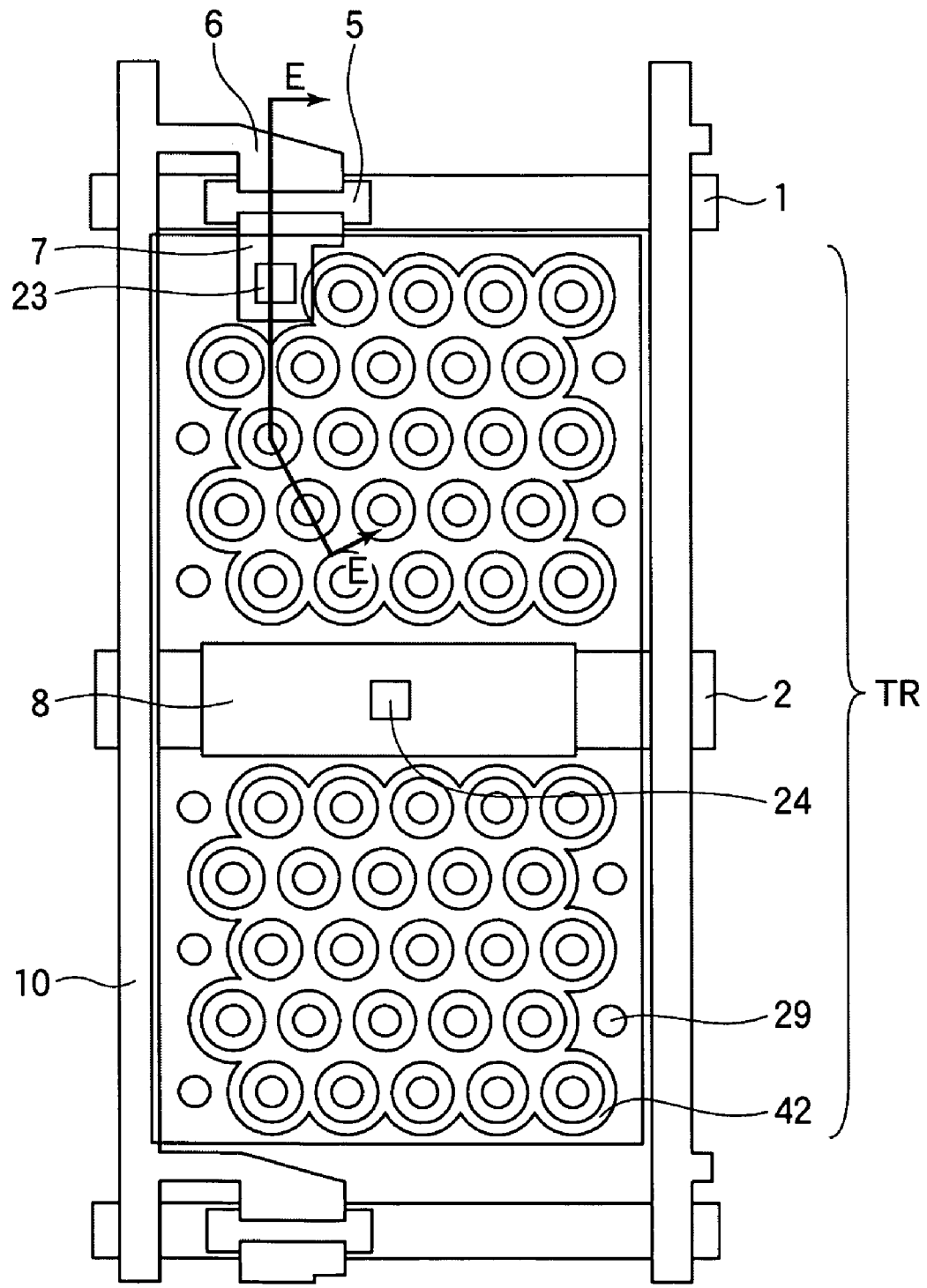
FIG. 18 is a diagram showing a constitution of one pixel of a TFT substrate according to Example 2-1 of the second embodiment of the invention.
Figure 19:
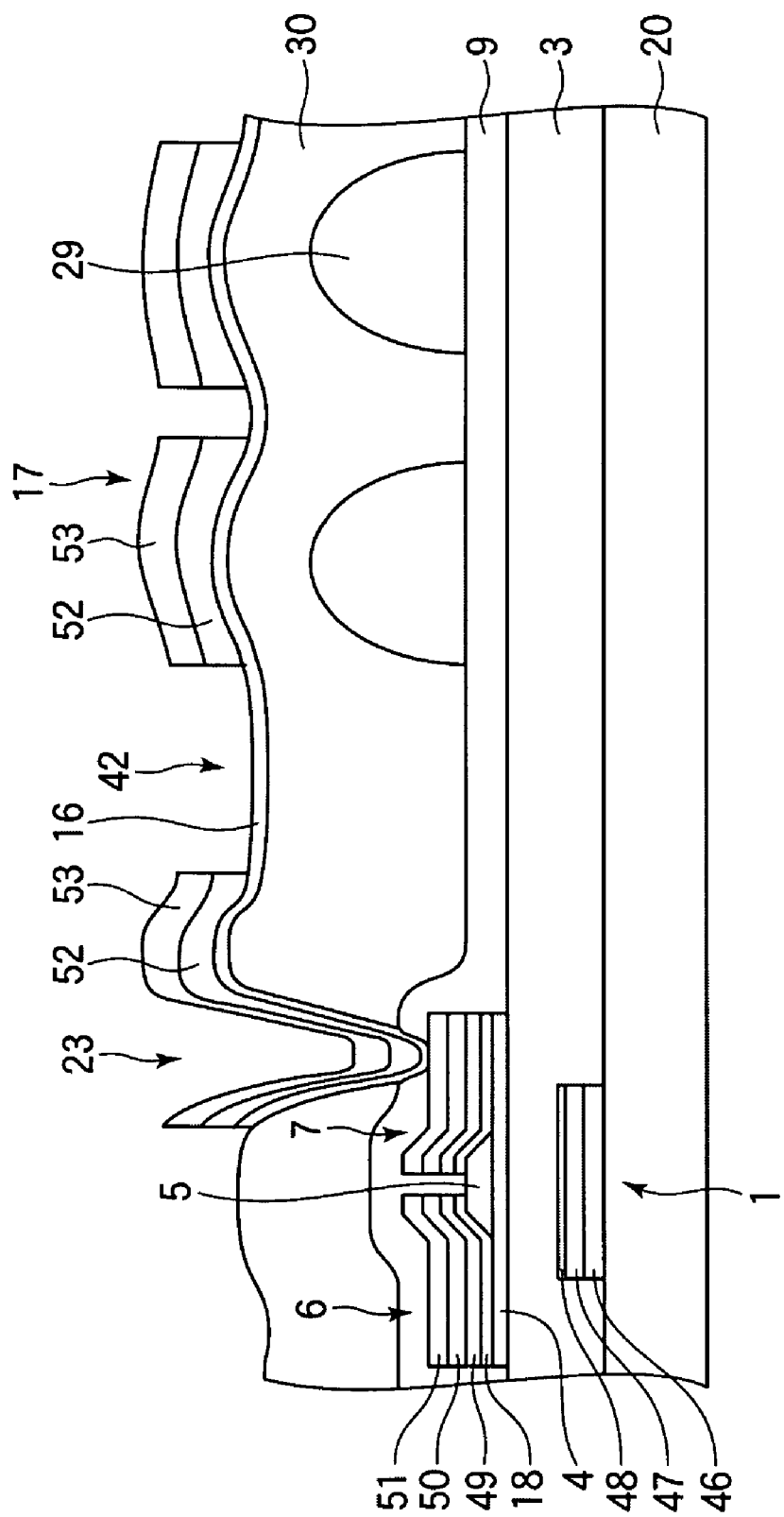
FIG. 19 is a cross sectional view showing a constitution of a TFT substrate according to Example 2-1 of the second embodiment of the invention.
Figure 20:
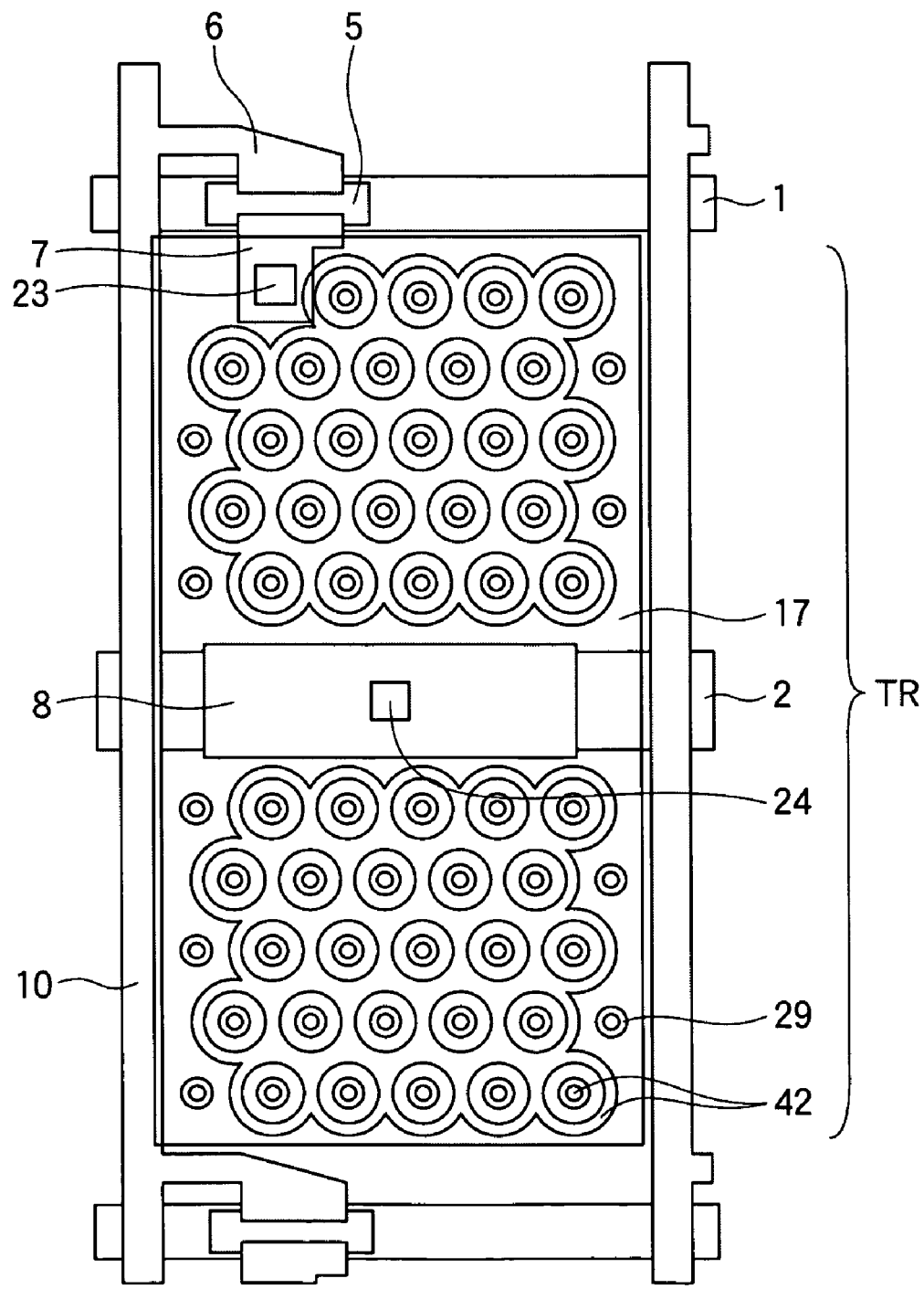
FIG. 20 is a cross sectional view showing a constitution of a modified example of a TFT substrate according to Example 2-1 of the second embodiment of the invention.

FIG. 18 is a diagram showing a constitution of one pixel of a TFT substrate according to Example 2-1 of the embodiment, and FIG. 19 is a cross sectional view showing the constitution of the TFT substrate on line E-E in FIG. 18. A gate bus line (gate electrode) 1 and a Cs bus line 2 are formed on an insulating substrate 20, such as glass. The gate bus line 1 and the Cs bus line 2 are formed, for example, of an accumulated film of an Al layer 46, an MoN layer 47 and an Mo layer 48. An insulating film 3, an operation semiconductor layer 4 and a channel protective layer 5 are formed thereon, and a contact layer (n$^+$ a-Si) 18, a drain electrode 6, a source electrode 7 and an intermediate electrode 8 are formed further thereon. The drain electrode 6, the source electrode 7 and the intermediate electrode 8 are formed, for example, of an accumulated film of a Ti layer 49, an Al layer 50 and a Ti layer 51. A protective film 9 formed, for example, of SiN is further formed thereon but may be omitted when unnecessary. Protrusions 29 for forming irregularity are formed thereon with a resin or the like by patterning into an island form for forming irregularity. An organic film (resin film) 30 is formed on the protrusions 29 for forming irregularity. The surface of the organic film 30 has moderate irregularity by leveling the irregularity of the protrusions 29 by the organic film 30. A pixel electrode containing a transparent electrode 16 formed of ITO and a reflective electrode 17 containing an accumulated film of an MoN (Mo containing nitrogen) layer 52 and an Al layer 53 formed on the transparent electrode 16 is formed on the organic film 30 for every pixel. The pixel electrode has an irregular surface corresponding to the irregularity of the organic film 30, and in this embodiment, an open area 42 where the reflective electrode 17 is removed is disposed on an area corresponding to the bottom of the irregularity. The open area 42 is used as a transmission area by removing the reflective electrode 17 with the transparent electrode 16 remaining. The open area 42 may also be formed on an area corresponding to the top of the irregularity, or on an area corresponding to both the bottom and top of the irregularity as shown in FIG. 20.

Figure 21:
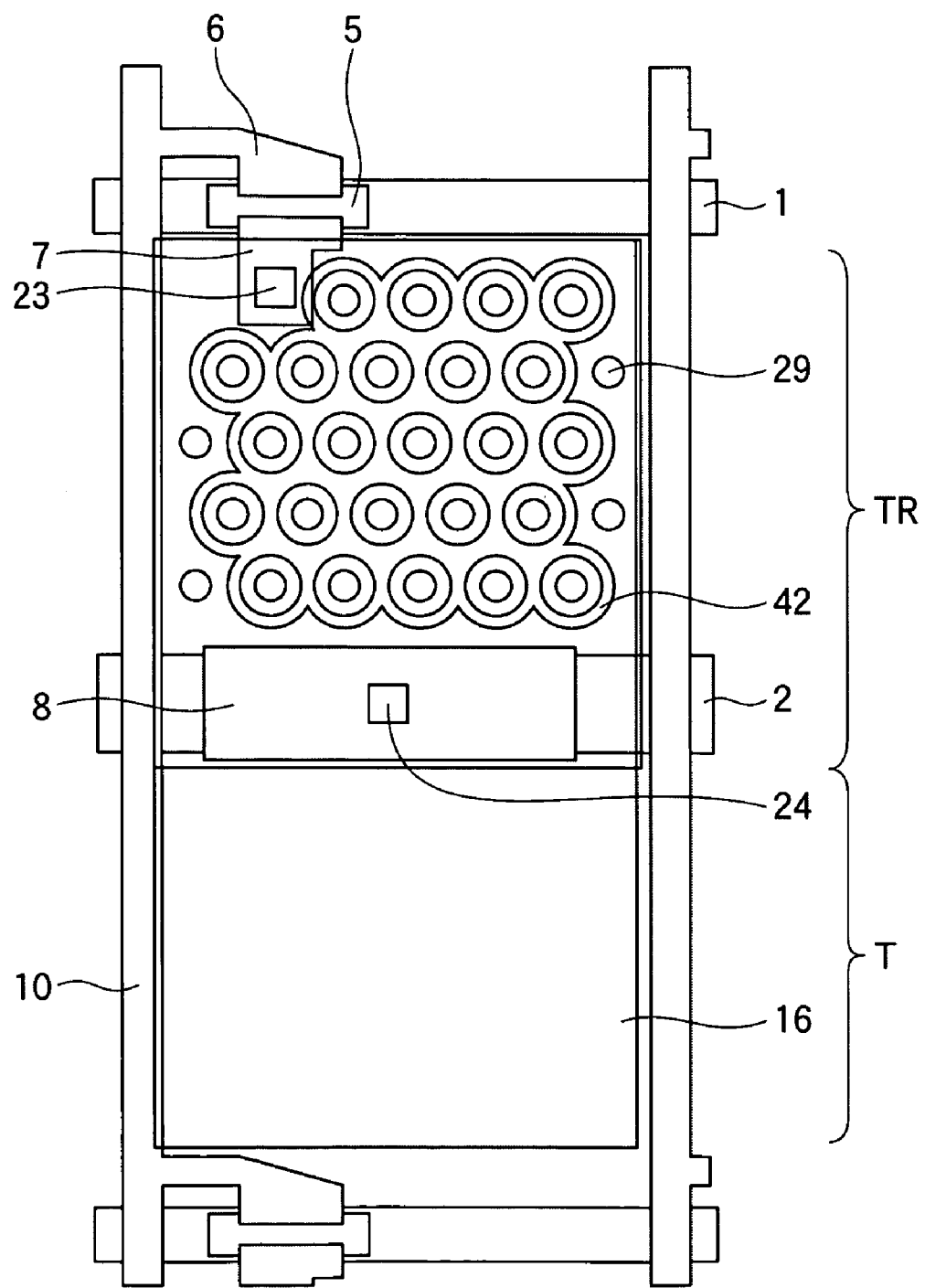
FIG. 21 is a cross sectional view showing a constitution of another modified example of a TFT substrate according to Example 2-1 of the second embodiment of the invention.

Aluminum is often used as the reflective electrode 17 owing to the relatively high reflectivity thereof, but is deteriorated through cell reaction upon development process when ITO is present as an underlayer. In the embodiment, accordingly, an MoN layer 52 is provided as a cover metal between the pixel electrode 16 (ITO) and the Al layer 53. While substantially the entire area of the pixel is the transflective area TR in this example, the lower half, for example, of the pixel may be the transmission area T having only the transparent electrode 16 formed as shown in FIG. 21.

Example 2-2

Figure 22:
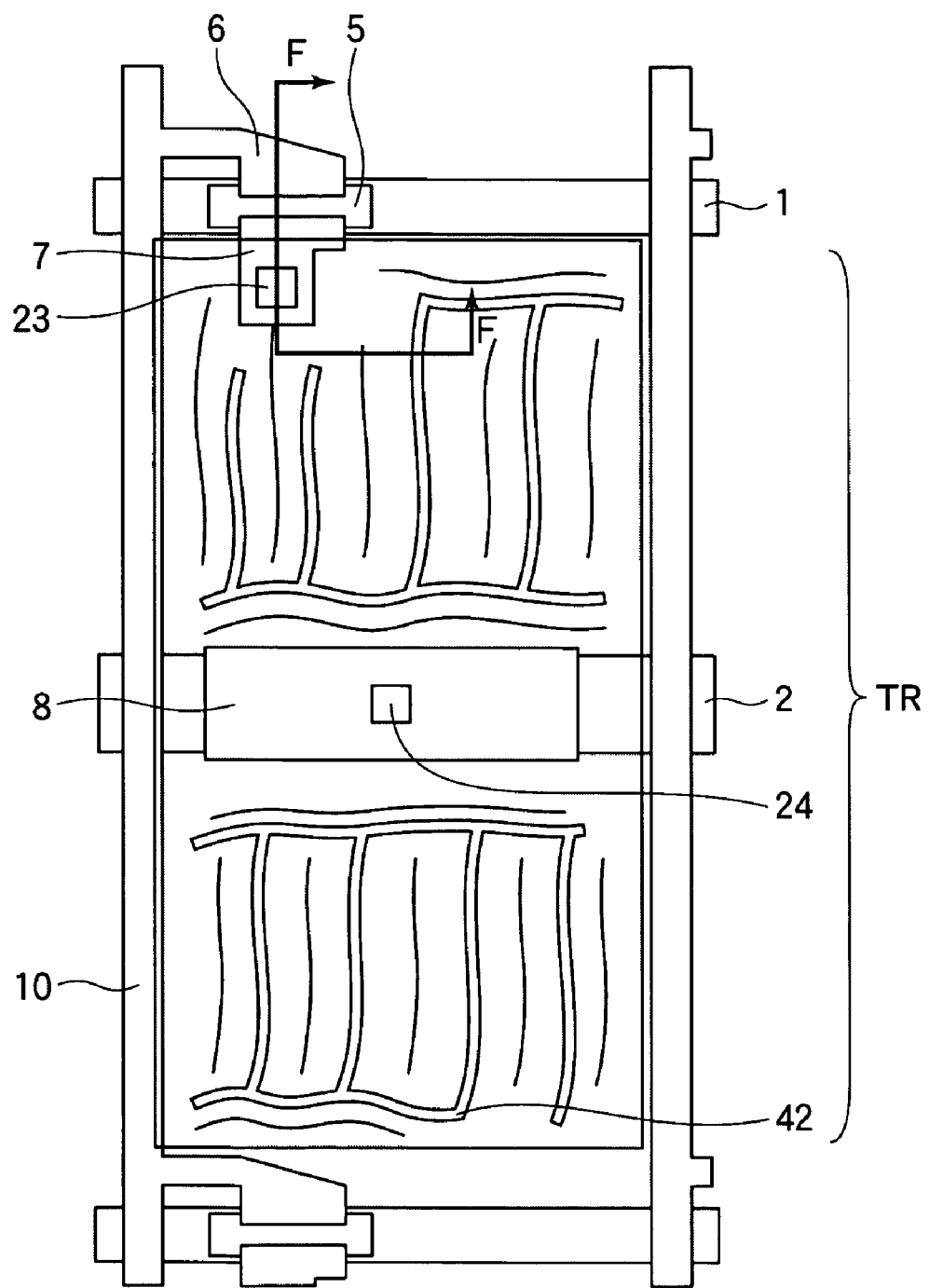
FIG. 22 is a diagram showing a constitution of one pixel of a TFT substrate according to Example 2-2 of the second embodiment of the invention.
Figure 23:
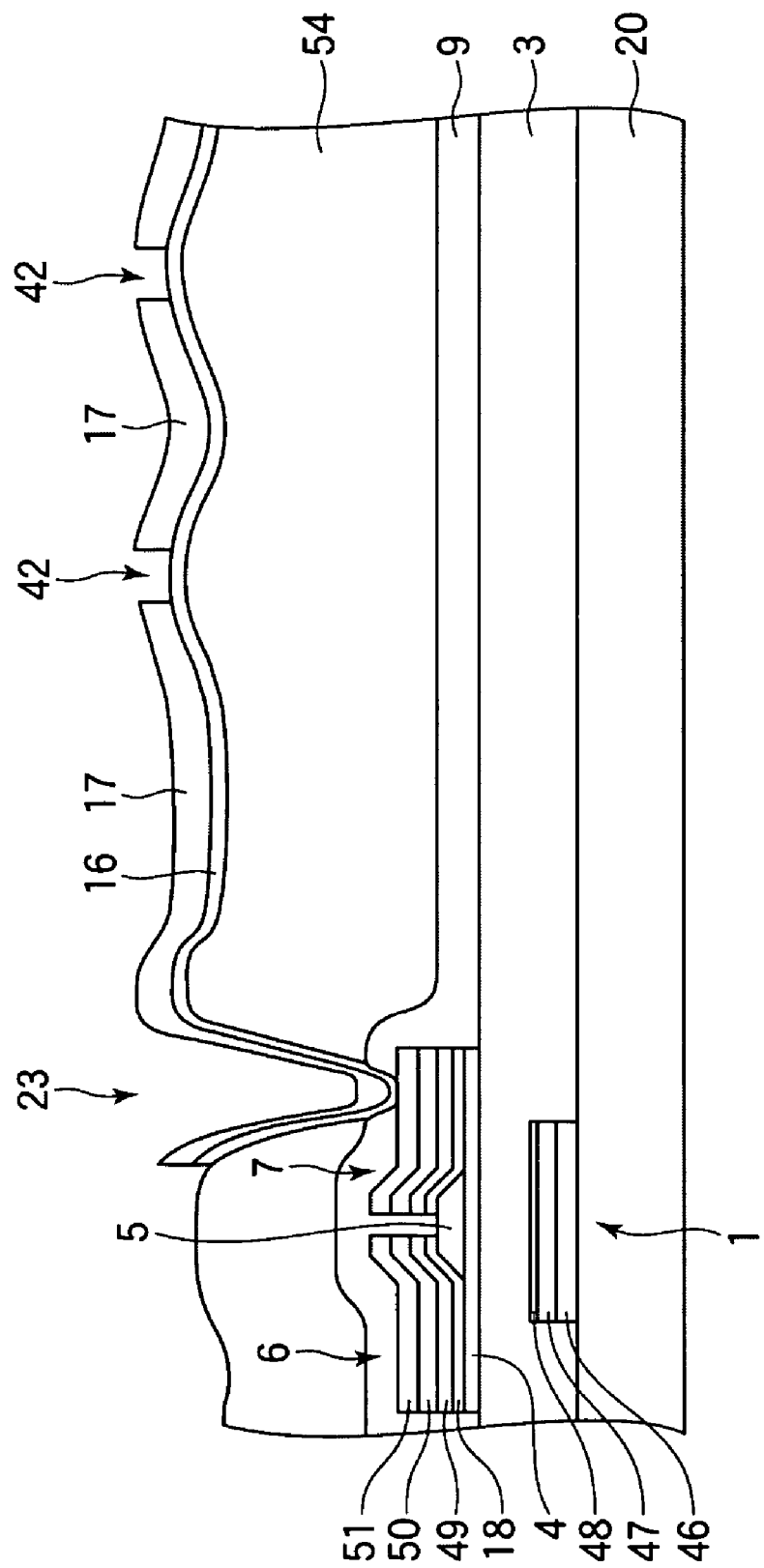
FIG. 23 is a cross sectional view showing a constitution of a TFT substrate according to Example 2-2 of the second embodiment of the invention.
Figures 24A, 24B, 24C:
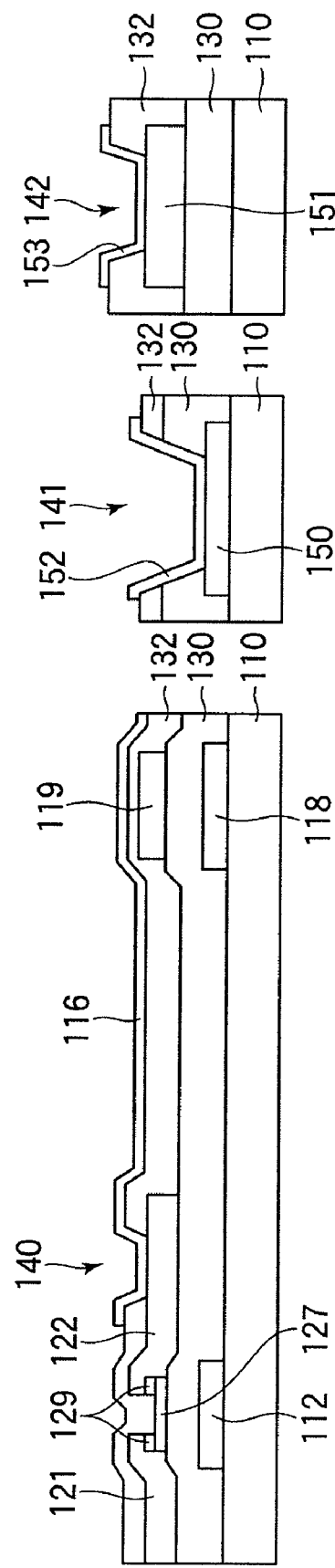
FIGS. 24A to 24C are cross sectional views showing a conventional TFT substrate.

FIG. 22 is a diagram showing a constitution of one pixel of a TFT substrate according to Example 2-2 of the embodiment, and FIG. 23 is a cross sectional view showing the constitution of the TFT substrate on line F-F in FIG. 22. A gate bus line (gate electrode) 1 and a Cs bus line 2 are formed on an insulating substrate 20, such as glass. An insulating film 3, an operation semiconductor layer 4 and a channel protective layer 5 are formed thereon, and a contact layer (n$^+$ a-Si) 18, a drain electrode 6, a source electrode 7 and an intermediate electrode 8 are formed further thereon. A protective film 9 formed, for example, of SiN is further formed thereon but may be omitted when unnecessary. A resin layer 54 having wrinkle irregularity is formed thereon. The wrinkle irregularity is formed in such a manner that the resin layer 54 is formed by coating, exposing, developing and heat-treating, and then the resin layer 54 is subjected to an UV treatment or ion doping, followed by subjecting to a heat treatment. A pixel electrode containing a transparent electrode 16 formed of ZnO$_x$ and a reflective electrode 17 containing Al is formed thereon for every pixel. The transparent electrode 16 may be formed of a compound containing ZnO$_x$ added with Al or Ga. ZnO$_x$ and the compound containing ZnO$_x$ added with Al or Ga cause no cell reaction even when Al is directly accumulated thereon as an upper layer. Accordingly, no cover metal is necessary in this example. The pixel electrode has a wrinkle-irregular surface corresponding to the irregularity of the resin layer 54. In this embodiment, an open area 42 in a line form where the reflective electrode 17 is removed is disposed on an area corresponding to the top of the wrinkle irregularity. The open area 42 is used as a transmission area by removing the reflective electrode 17 with the transparent electrode 16 remaining.

While the channel protective film TFT substrate is exemplified in Examples 2-1 and 2-2, this embodiment may be applied to a channel etch TFT substrate.

A production method of a TFT substrate according to the embodiment will be briefly described below.

(1) An Al layer 46, an MoN layer 47 and an Mo layer 48 are formed as a first electroconductive layer on an insulating substrate 20, and a gate bus line 1 and a Cs bus line 2 are formed.

(2) An insulating film 3, an a-Si film and an SiN film are continuously formed. The SiN film is then patterned to an island form to form a channel protective film 5.

(3) An n$^+$ a-Si film, and a Ti layer 49, an Al layer 50 and a Ti layer 51 as a second electroconductive layer are formed in this order. A drain electrode 6, a source electrode 7, a drain bus line 10 and an intermediate electrode 8 are formed with the second electroconductive layer.

(4) A protective layer 9 is then formed. The protective layer 9 may be a silicon nitride layer formed by a CVD method, or may be an insulating layer, such as silicon oxide, or a resin insulating layer.

(5) Thereafter, the resin layer is patterned into a plurality of islands to form protrusions 29 for forming irregularity, and an organic layer 30 is formed thereon. The surface of the organic film 30 has moderate irregularity by leveling the irregularity of the protrusions 29 by the organic film 30.

(6) An ITO layer to be a transparent electrode 16, an MoN layer 52 to be a lower layer of a reflective electrode 17, and an Al layer 53 to be an upper layer of a reflective electrode 17 are formed. A layer of a high melting point metal, such as Mo and Ti, may be formed instead of the MoN layer 52, and a layer of an Al alloy, Ag or an Ag alloy may be formed instead of the Al layer 53. $ZnO_x$ or a compound containing $ZnO_x$ added with Al or Ga (or both Al and Ga) may be used instead of ITO. In this case, no cell reaction occurs upon developing even when Al or Ag is accumulated directly without a layer of a high melting point metal, such as Mo, and therefore, the reflective electrode 17 may be a single layer of Al, an Al alloy, Ag or an Ag alloy. After forming the layers, the pixel electrode is patterned by formation of a resist mask, etching, and removal of the resist mask. The pixel electrode has irregularity corresponding to the irregularity of the organic film 30 as an underlayer. For example, in the case where an open area 42 is formed on an area corresponding to a top of the irregularity, the entire surface of the substrate is polished after completing the formation of the layers or after patterning the layers, so as to remove the reflective electrode 17 on an area corresponding to a top of the irregularity in a self-aligning manner. The open area 42 may also be formed by using a photolithography method. A TFT substrate is thus completed through the aforementioned procedures.

In the case of producing a liquid crystal display device using a TN liquid crystal, for example, the substrate is then subjected to such steps as print of an orientation film, rubbing, adhesion with a counter substrate, cutting, and injection of a liquid crystal, so as to complete a transflective liquid crystal display device.

As having been described, according to the embodiment, such a transflective liquid crystal display device that provides good display characteristics, and a substrate for a display device used therein can be realized.

What is claimed is:

1. A substrate for a display device, the substrate comprising:

an accumulated electrode having an accumulated structure including a lower layer formed on a substrate, and an upper layer comprising ZnO and formed above the lower layer;

an insulating film providing between the lower layer and the upper layer, and also covering the accumulated electrode;

a contact hole opening in the insulating film on the accumulated electrode; and a pixel electrode formed on the insulating film and being connected directly to the upper layer of the accumulated electrode through the contact hole.

2. The substrate for a display device according to claim 1, wherein the substrate for a display device further comprises:

a terminal part formed in the same layer as the accumulated electrode; and a contact hole opening in the insulating film on the terminal part.

3. The substrate for a display device according to claim 1, wherein the lower layer and the upper layer are patterned in substantially the same shape.

4. A liquid crystal display device comprising a pair of substrate facing each other and a liquid crystal sealed between the pair of substrates, one of the pair of substrates being the substrate for a display device according to claim 1.

5. The substrate for a display device according to claim 1, wherein the lower layer comprises Al or an Al alloy.

6. The substrate for a display device according to claim 3, wherein the lower layer and the upper layer are formed in the same photolithography process.

7. A substrate for a display device, the substrate comprising:

a resin layer having an irregular surface formed on a transparent substrate;

a pixel electrode having an irregular surface corresponding to the surface of the resin layer and having such a structure that a transparent electrode transmitting light and a reflective electrode reflecting light are accumulated at least in part; and a plurality of pixel areas each having a reflective area having the transparent electrode and the reflective electrode accumulated, and a transmission area where the reflective electrode is removed on an area corresponding to a top, a bottom or both of the top and bottom of the irregular pixel electrode.

8. The substrate for a display device according to claim 7, wherein the resin layer is transparent.

9. The substrate for a display device according to claim 7, wherein the transmission area is disposed on an area where an oblique angle of the surface of the resin layer is 6° or less with respect to the substrate.

10. The substrate for a display device according to claim 7, wherein the transparent electrode comprises ITO, $ZnO_x$, or a compound containing $ZnO_x$ added with Al or Ga.

11. The substrate for a display device according to claim 7, wherein the reflective electrode has an accumulated structure comprising at least two layers containing a lower layer comprising Mo, Mo containing nitrogen, or Ti, and an upper layer comprising Al, an Al alloy, Ag, or an Ag alloy.

12. The substrate for a display device according to claim 7, wherein the transparent electrode comprises $ZnO_x$, or a compound containing $ZnO_x$ added with Al or Ga, and the reflective electrode comprises a single layer containing Al, an Al alloy, Ag, or an Ag alloy.

13. A substrate for a display device, the substrate comprising:

a gate bus line, a gate bus line terminal part, and a gate electrode of a thin line transistor formed on a substrate;

a gate insulating film covering the gate bus line, the gate bus line terminal part, and the gate electrode;

an operation semiconductor film formed on the gate insulating film;

a source electrode of the thin film transistor having an accumulated structure including a first lower layer and a first upper layer comprising ZnO formed on the first lower layer;

a protective film covering the source electrode;

a first contact hole opening in the protective film on the source electrode;

a pixel electrode formed on the protective film and being connected directly to the first upper layer of the source electrode through the first contact hole;

a second contact hole opening in the gate insulating film and the protective film on the gate bus line terminal part; and an upper electrode formed of the same layer as the pixel electrode and being connected directly to the gate bus line terminal part through the second contact hole.

14. The substrate for a display device according to claim 13, wherein the substrate further comprises:

a storage capacity bus line and a storage capacity bus line terminal part formed of the same layer as the gate bus line;

an intermediate electrode formed of the same layer as the source electrode; and a third contact hole opening in the protective film on the intermediate electrode;

wherein the pixel electrode is connected directly to the intermediate electrode through the third contact hole.

15. The substrate for a display device according to claim 13, wherein the gate bus line, the gate bus line terminal part, and the gate electrode each having an accumulated structure including a second lower layer and a second upper layer comprising ZnO formed on the second lower layer; and wherein the upper electrode is connected directly to the second upper layer of the gate bus line terminal part through the second contact hole.

16. The substrate for a display device according to claim 13, wherein the substrate further comprises:

a drain bus line terminal part formed of the same layer as the source electrode; and a contact hole opening in the protective film on the drain bus line terminal part.

17. The substrate for a display device according to claim 13, wherein the first lower layer and the first upper layer are patterned in substantially the same shape.

18. The substrate for a display device according to claim 13, wherein the first lower layer comprises Al or an Al alloy.

19. The substrate for a display device according to claim 17, wherein the first lower layer and the first upper layer are formed in the same photolithography process.

* * * * *